US006538788B2

(12) United States Patent
Franco et al.

(10) Patent No.: US 6,538,788 B2
(45) Date of Patent: Mar. 25, 2003

(54) METHOD FOR THE REDUCTION OF NOISE IN A LONG-DISTANCE OPTICAL TELECOMMUNICATIONS SYSTEM

(75) Inventors: Pierluigi Franco, Padua (IT); Michele Midrio, Padua (IT); Marco Romagnoli, Milan (IT)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/759,525

(22) Filed: Jan. 16, 2001

(65) Prior Publication Data

US 2001/0024307 A1 Sep. 27, 2001

Related U.S. Application Data

(63) Continuation of application No. 09/540,286, filed on Mar. 31, 2000, now abandoned.
(60) Provisional application No. 60/127,949, filed on Apr. 6, 1999.

(30) Foreign Application Priority Data

Apr. 1, 1999 (EP) .............................. 99106659
Apr. 8, 1999 (EP) .............................. 99106933

(51) Int. Cl.[7] .............................................. H04B 10/00
(52) U.S. Cl. ...................... 359/161; 359/173; 359/124
(58) Field of Search ........................ 359/161, 173, 359/195, 115, 124

(56) References Cited

U.S. PATENT DOCUMENTS 5,343,322 A     8/1994  Pirio et al. .................. 359/173
5,642,215 A  *  6/1997  Suzuki et al. ............... 359/161
5,986,789 A  * 11/1999  Kawai et al. ................ 359/173
6,275,315 B1 *  8/2001  Park et al. ................... 359/161

OTHER PUBLICATIONS

Yoichi Fujii, "Information–Maintaining Separation of Optical Pulses Employing Nonlinearity of Silica Fiber," Applied Optics, vol. 29, No. 6, Feb. 20, 1990, pp. 864–869.
Rongqing Hui, et al, "Modulation Instability and Its Impact in Multispan Optical Amplified IMDD Systems: Theory and Experiments," Journal of Lightwave Technology, vol. 15, No. 7, Jul., 1997, pp. 1071–1081.

* cited by examiner

Primary Examiner—Kinfe-Michael Negash
(74) Attorney, Agent, or Firm—Oblon, Spivak, McClelland, Maier & Neustadt, P.C.

(57) ABSTRACT

A system for providing noise reduction in a long-distance telecommunications system is disclosed. A transmitter generates an optical signal. An optical link includes an optical amplifier that transmits the optical signal in a pre-established direction of propagation with substantially compensated dispersion to have an associated optical noise. A receiver is configured to receive a noisy optical signal including the transmitted optical signal and an optical noise signal. The receiver includes a photodetecting device that is configured to generate an electronic signal correlated with the noisy optical signal. The electronic signal being associated with a quality parameter (Q) that depends on said optical noise signal and distortion of the optical signal in the optical link. The optical link further includes a dispersive and nonlinear filtering device that has a normal dispersion and nonlinear component. The filtering device is placed along said optical link and has an associated normal dispersion parameter $\beta_{2,NORM} \cdot L$ and a nonlinearity parameter $\gamma$ operatively selected so as to increase the quality parameter by at least 1 dB.

77 Claims, 8 Drawing Sheets

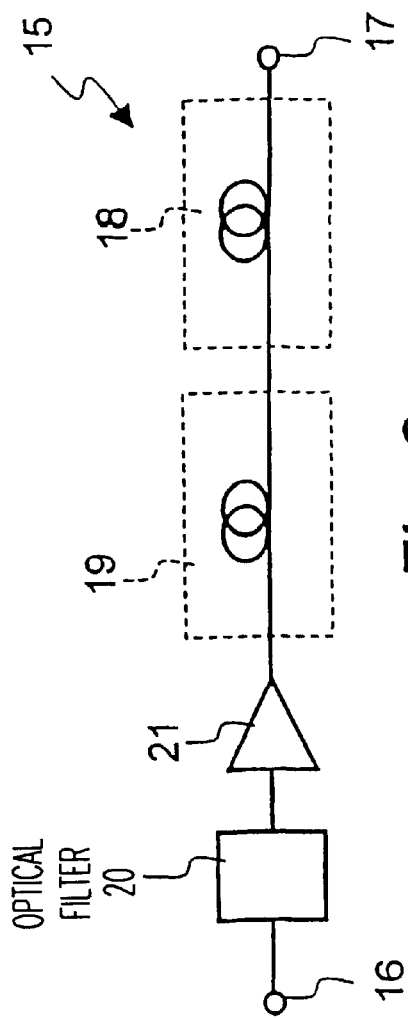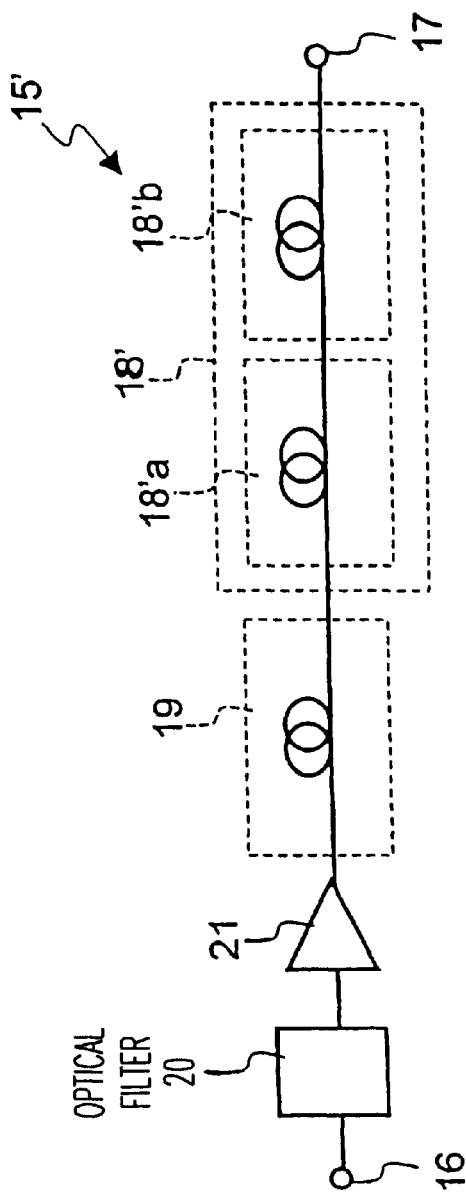

METHOD FOR THE REDUCTION OF NOISE IN A LONG-DISTANCE OPTICAL TELECOMMUNICATIONS SYSTEM

CROSS-REFERENCE TO RELATED APPLICATIONS

This application is related to and claims benefit of priority to (i) European Patent Application No. 99106659.8, filed Apr. 1, 1999, (ii) European Patent Application No. 99106933.7, filed Apr. 8, 1999, and (iii) U.S. Provisional Patent Application Ser. No. 60/127,949, filed on Apr. 6, 1999, entitled "Method for the Reduction of Noise in a Long-Distance Optical Telecommunications System;" and (iv) is a continuation of Patent Application Ser. No. 09/540,286, filed Mar. 31, 2000, now abandoned, all of which are incorporated herein by reference in their entirety.

BACKGROUND OF THE INVENTION

1. Field of the Invention

This invention relates to a telecommunication system, and more particularly, to noise reduction in a long-distance optical telecommunications system.

2. Discussion of the Background

In a long-distance optical telecommunications system, the transmitted signal generally suffers from effects of nonlinearity and dispersion, which must be taken into consideration when it comes to optimizing the parameters of the system itself. On account of these effects, the signal received at the end of the communication line may have distortion (or variations of form), constituting a limitation on the system's transmission capacity. In order to minimize the distortion, it is possible to use special transmission techniques, which depend on characteristics of the system in question, such as the bit transmission speed (or bit rate), the length of the connection, the spacing between the amplifiers and the number of WDM channels. To quote as examples of these techniques, there is chromatic dispersion compensation by means of dispersion compensation fibers or variable-pitch Bragg gratings, solitonic transmission without chromatic dispersion compensation and solitonic transmission with arrangements for chromatic dispersion compensation, as described, for example, in patent application WO99/08406 filed by the Applicant. The latter-named technique, in some cases, may represent a suitable solution for reducing the distortion in the system.

A further phenomenon, constantly present in optically amplified transmission systems, is represented by the progressive increase in amplifier spontaneous emission noise (ASE) generated along the line by the line optical amplifiers. Each time the signal passes through an optical amplifier, spontaneous emission noise is added to it. At the line end, the influence of ASE noise on the system's performance will be correspondingly greater, the higher the level of this noise (in terms of optical power) in relation to the signal level, that is to say the lower the signal-to-noise ratio (SNR), defined as the ratio of the optical power associated with the signal to the optical power associated with the noise in a pre-established reference band of wavelength. In general, the minimum value needed for the signal-to-noise ratio in order to guarantee correct reception of the signal depends on the characteristics of the system under examination (bit rate, transmitted signal format, receiver characteristics).

When distortion and ASE noise are simultaneously present at the end of the link, the performances of the system change depending on the size of the two contributions. Generally speaking, the impairment of the system's performances due to distortion and noise must not be in excess of established limits, beyond which correct signal reception is no longer guaranteed. In order to maintain the signal impairment within the established limits, constraints are generally imposed when defining the system parameters, and particularly when defining the bit rate, the number of WDM channels to be transmitted, the overall length of the link, the number of amplifiers to be inserted in the link and the output power of the amplifiers.

If the nonlinear effects present in the system are negligible, it may be assumed that, during propagation of the signal, there is no interaction between signal and noise and, therefore, that the ASE noise may be considered as an additional contribution to the signal. In this case, the impairment of the signal received corresponds to the combination of the impairment due to the distortion (calculated as if the ASE noise did not exist) and the impairment due to the ASE noise (calculated as if the distortion did not exist).

If, on the other hand, the nonlinear effects present in the system are not negligible, for example in the case of long-distance transmissions and/or transmissions at a high bit rate, the optical signal and the optical noise propagated along the line interact with one another. This interaction occurs due to the effect of a phenomenon known as "modulation instability", described for example in G. P. Agrawal, Nonlinear Fiber Optics, Academic Press, pages 134–141 and 267–273. In particular, there is modulation instability in a transmission medium if, together with the chromatic dispersion, there is a particular type of nonlinearity, known as "Kerr effect", which is found with the refractive index of the medium depending on the intensity of the optical signal passing through the medium itself. In the remainder of this description, when we speak of nonlinearity, we will be referring to the nonlinearities known as "Kerr effect".

In the case in hand, the phenomenon of modulation instability manifests itself as follows. Consider a transmission line in which there is propagation both of an optical signal S and an optical noise n. The optical noise n is a complex quantity and may be divided into a component $n_F$ in phase with the signal S and a component $n_Q$ in quadrature with the signal S. The modulation instability originating at the end of the transmission line may have different effects depending on whether the chromatic dispersion along the line is of normal or anomalous type. In the case of a line operating with anomalous dispersion, the modulation instability causes an amplification of both the in-phase noise component $n_F$ the quadrature noise component $n_Q$ to the detriment of the signal S. On the other hand, where the dispersion is of normal type, only the quadrature component $n_Q$ is amplified to the detriment of the signal S, whereas the in-phase component $n_F$ is attenuated. These phenomena are described in detail in M. Midrio, "Statistical Properties of Noise Propagation in Normal Dispersion Nonlinear Fibers", J. Opt. Soc. Am. B. vol. 14, n. 11 November 1997, pages 2910–2914.

In a telecommunications system, at the end of the transmission line the signal and the noise are generally received by a quadratic type photodetector (a photodiode), in which beating occurs between the signal and the noise. In actual fact, however, the beating is only between the signal and the in-phase component $n_F$, whereas the quadrature component $n_Q$ does not cause beating with the signal, but only with itself. This is because the electronic signal received by the photodetector is proportional to the power of the optical radiation received, that is to say to the quantity:

$$|S+n_F+i\,n_Q|^2 = S^2 + n_F^2 + 2\cdot S\,n_F + n_Q^2$$

In this expression, $S^2$ represents the effective signal detected by the photodiode. The other terms represent noise contributions. Usually the terms $n_F^2$ and $n_Q^2$ are negligible and, therefore, the main contribution to the noise at the receiver is given by $2 \cdot S \cdot n_F$, i.e. the term that represents the beating of the signal with the in-phase noise.

Therefore the main contribution to signal impairment due to noise comes from the beating [signal]-[in-phase noise], whereas the beatings [quadrature noise]-[quadrature noise] and [in-phase noise]-[in-phase noise] are non-influential, apart from effects of a secondary order. The presence of this type of signal impairment defines a technical problem that the Applicant has perceived as being very important in the development of optical telecommunications systems, particularly over long-distances (indicatively, distances of more than 500 km) and with high performance, for example with a bit rate greater than or equal to 2.5 Gbit/s.

With regard to continuous transmission of optical signals (i.e., on a single wavelength and with no added information), the effect of modulation instability on the noise is studied, for example, in the above article by M. Midrio. The study presented in this article confirms that, in continuous transmission of signals in a normal dispersion optical fiber, the modulation instability acts by causing a decrease of the noise in-phase component. This behavior is the opposite of that observed in an anomalous dispersion fiber, where the noise in-phase component is amplified.

The article written by R. Hui and M. O'Sullivan "Noise Squeezing Due to Kerr Effect Nonlinearities in Optical Fibres with Negative Dispersion", Electronics Letters, Oct. 10, 1996, vol. 32, no. 21, pages 2001–2003, describes an experiment in which two erbium doped fiber amplifiers (EDFA) are used to amplify the continuous wave (CW) optical radiation emitted by a laser diode and to generate a given level of ASE. A wide band photodiode and a microwave spectrum analyser are used as the receiver to measure the relative intensity noise (RIN) spectrum. A positive (i.e., anomalous) dispersion optical fiber or, alternatively, a negative (i.e., normal) dispersion optical fiber is connected between the output of the second optical amplifier and the photodiode. The article demonstrates that it is possible to reduce the amplitude of the relative intensity noise RIN in systems with negative (normal) dispersion fibers. The article suggests that the physical reason for the reduction of RIN is linked to the partial coherence between the signal and the ASE due to Four Wave Mixing (FWM) in negative (normal) dispersion fibers. The article indicates that there could be practical applications for the noise squeezing in a system with negative dispersion fibers, with possible improvements in the performance of an Intensity-Modulated Direct Detection system (IM-DD).

However, the Applicant observes that, with regard to the practical arrangements for using the effect indicated in an optical telecommunications system, the article states only that the Four Wave Mixing could have an important role and that it should be taken into account when designing an appropriate dispersion compensation.

A further article by R. Hui et al., "Modulation Instability and Its Impact in Multispan Optical Amplified IMDD Systems: Theory and Experiments", Journal of Lightwave Technology, Vol. 15, No. 7, July 1997, pages 1071–1081, presents a theoretical and experimental study of the effects of the nonlinear interaction between the ASE noise and the signal transmitted in a dispersive optical fiber. The article shows that, in a normal dispersion system, the nonlinearity reduces the negative effects of the ASE noise with respect to the case of linear propagation and, on the other hand, under anomalous dispersion conditions, nonlinearity always impairs system performance as compared to the case of linear propagation. The article indicates that compensation of the chromatic dispersion is an effective way of reducing the effects of modulation instability and discusses the optimal placing of the dispersion compensator. In particular, it is shown that, in a line of this type, the effects of modulation instability are reduced more with a concentrated type dispersion compensation located before the receiver than when the compensation is distributed all along the line. Concentrated compensation is produced using an optical fiber with suitable dispersion characteristics. The power of the signal input to this fiber is selected so that the production of nonlinear effects may be avoided inside the fiber.

The Applicant observes that, in this article as well, the experiments concern only continuous signal transmission.

The Applicant has noted that up to now the studies of the modulation instability phenomenon have chiefly concerned the continuous transmission of signals. The Applicant considers that these studies are not exhaustive, in the sense that they do not describe the most interesting situation in the art of optical transmissions, i.e., that in which the signal carries coded information. The Applicant has observed that, in the case of transmission of signals carrying coded information, there are signal distortion phenomena that affect the quality of the signal received and that cannot be neglected.

The article "The Effect of Dispersion Compensation on System Performance When Nonlinearities are Important", by A. N. Pilipetskii et al., IEEE Photonics Technology Letters, Vol. 11, No. 2, February 1999, pages 284–286, asserts that the placing of dispersion compensation at the end of a nonlinear system affects both signal variance (i.e., the noise) and pulse distortion. By dint of experiments and theoretical considerations, the article demonstrates that selecting dispersion compensation to minimize the pulse distortion, rather than the signal variance, enables optimal performance to be achieved for an experimental configuration of 4780 km. The transmission fibers used in the experimental configuration have normal dispersion (−2 ps/nm/km). The dispersion compensation is obtained in the experiment and the simulations using anomalous dispersion fibers (+17 ps/nm/km). The article concludes that, ideally, it could be possible to create a dispersion map in order to obtain noise squeezing and, at the same time, minimize pulse distortion through suitable selection of the dispersion map and through pre- and post-compensation of dispersion. In particular, the post-compensation of dispersion could be used to minimize the variance (i.e., the noise), whereas an optimization of the pulses for the corrected dispersion map could be obtained, at the same time, through correct pre-compensation of dispersion. The Applicant notes that the power values per channel indicated in the article are relatively low, that is to say insufficient to cause significant nonlinear effects in the dispersion compensation fiber DPSC added to the receiver. The Applicant also notes that the reduction of the noise effects supposed in the article is achieved using the dispersion of the optical fibers that constitute the telecommunications line and, when required, pre- and post-type dispersion compensations, together with the nonlinearity of only the optical fibers constituting the telecommunications line.

The Applicant has noted that the solutions proposed up to now to reduce the negative effects of modulation instability envisage an ad hoc selection of the dispersion compensators. These solutions require that the modulation instability problem be taken into account as early as the design stage of the transmission system, making it difficult or impossible to make changes to already installed optical systems, to increase the bit rate for example, in order for the effects of modulation instability to be taken into consideration.

The Applicant has examined the problem of supplying a technique for reducing noise that is easily and rapidly applicable to any optical telecommunications system having non-negligible optical noise, for example ASE noise, such as a long-distance system (for example, over 500 km) and/or a system with a high bit rate (greater than or equal to 2.5 Gbit/s).

Typically in an optical telecommunications system of this type, the dispersion compensation is made by alternating, along the telecommunications line, spans of transmission fiber having dispersion of opposite sign, or by inserting, usually at the optical amplifiers, suitable compensators having dispersion of opposite sign to that of the fibers constituting the telecommunications line.

The techniques and the chromatic dispersion compensation devices generally employed in optical transmission systems permit the compensation of a predetermined percentage, called ratio of compensation (RC), of the dispersion previously accumulated by the signal. In the case of transmission lines with fibers of nonuniform length and/or dispersion characteristics, the ratio of compensation (RC) is defined as the average of the ratios of compensation of the different spans of optical fiber between successive amplifiers along the line, weighted in relation to the lengths of the spans themselves. The ratio of compensation is preferably, though not necessarily, less than 100% in anomalous dispersion systems and greater than 100% in normal dispersion systems. The optimal level of the ratio of compensation depends on numerous system parameters, such as the number and length of the spans of fiber used, the coefficient of dispersion of the spans of fiber, the amount of signal pre-chirping at the transmission station, where applicable, and the optical power level of the signals transmitted.

The known art suggests that the effects of noise may be limited by exploiting the modulation instability normally present in the optical fibers used for long distance transmissions and by taking the modulation instability into consideration when designing the "compensation map", i.e., the location and characteristics of the dispersion compensators along the line.

The Applicant has found that slight improvements may be had in this way in the system transmission capacities, but that these improvements are not significant with respect to "linear" transmission conditions.

As stated previously, in a normal dispersion optical fiber, modulation instability acts by causing a decrease of the noise in-phase component and a corresponding increase of the quadrature component. The Applicant has observed, however, that an anomalous dispersion optical component (constituted, for example, by an optical fiber or a chirped grating dispersion compensator) arranged along a telecommunications line comprising optical amplifiers results in a redistribution of the noise, between the two quadrature $n_Q$ and in-phase $n_F$ components, producing a substantial rebalancing of power of the components. The Applicant has found, therefore, that if an anomalous dispersion component is arranged downstream of a normal dispersion fiber, at least part of the noise transferred from the in-phase component $n_F$ to the quadrature component $n_Q$ in the normal dispersion fiber due to modulation instability is transferred in the opposite direction in the anomalous dispersion component, and there is accordingly a reduction in the effectiveness of the noise squeezing obtained previously. In a telecommunications line where the dispersion is compensated by means of alternating normal dispersion optical fibers and anomalous dispersion components (such as optical fibers or dispersion compensators with variable pitch grating), the abovementioned phenomenon of noise transfer in one direction and then in the other between the two in-phase and quadrature components is repeated numerous times and the effect of the noise squeezing at line end is relatively reduced.

The Applicant has determined that it is possible to improve system performance considerably, beyond the values corresponding to linear transmission conditions, and accordingly to overcompensate the effects of noise, by using nonlinearity combined with normal dispersion, concentrated at the end of the transmission line. This technique may be used in addition to the usual dispersion compensation techniques indicated above.

The Applicant has observed in particular that the reduction in optical noise obtainable by subjecting the optical signal at the end of the transmission line to suitably selected nonlinear phase shifting and normal dispersion may produce greater benefit than the negative effects due to the increase in distortion accordingly introduced.

The Applicant has determined that the dispersion compensation may be advantageously selected, on the basis of the previously mentioned parameters (number and length of the spans of fiber used, coefficient of dispersion of the spans of fiber, amount of the signal pre-chirping, where applicable, and optical power level of the transmitted signals), so as to obtain a sufficiently low distortion, without taking the effects of modulation instability on the noise into account. An acceptable distortion is that corresponding to a closing of the eye diagram of less than 2 dB. Preferably, however, the dispersion of the communication system is selected in such a way as to guarantee a closing of the eye diagram less than or equal to 1 dB.

In general, the Applicant has found that the distortion of signals in dispersion compensation systems may be effectively reduced by using a RC value of between 80% and 120%.

Preferably the ratio of compensation is between 85% and 115%. More preferably, RC is between 90% and 110%.

SUMMARY OF THE INVENTION

A nonlinear filter according to the invention comprises a normal dispersion and nonlinear component suitable for reducing the noise component in phase with the signal, suitable for being connected at the end of a dispersion-compensated optical telecommunications line. The nonlinear filter of the invention may also comprise an anomalous dispersion component disposed upstream of the normal dispersion and nonlinear component, suitable for correcting the shape of the pulses making up the signal.

The device of the invention is applied preferably to telecommunications systems suitable for transmitting RZ format digital signals, i.e., signals formed by pulses of lesser duration than the period corresponding to the data rate adopted, modulated on the basis of the digital information to be transmitted. In the remainder of this description, reference will be made in particular to solitonic or almost solitonic-type RZ signals, namely signals in which the pulse time shape is of the $\text{sech}^2(t)$ or similar type (for example, Gaussian), which are of special interest in the development of new long-distance transmission systems.

The Applicant has furthermore developed a method for reducing noise, comprising the step of feeding a signal transmitted on an optical telecommunications line end substantially free of distortion, before its reception, to a device having both characteristics of normal dispersion and characteristics of nonlinearity. This method may be used for reducing the optical noise in telecommunications systems substantially compensated in dispersion, and is advantageously applicable to telecommunications systems already designed or installed, permitting to optimize the performance of the transmission system in relation to noise in a way that is independent of the optimization of its other technical characteristics, such as for example dispersion.

The method of the invention is particularly suitable for systems operating with RZ type digital signals.

The method and device of the invention allow the signal-to-noise ratio at the end of the transmission line to be increased and, accordingly, the quality of the signal received to be improved, without having to alter the system parameters. This leads to the possibility of obtaining, for a like quality of the signal received, a transmission system having a greater overall length and/or a greater distance between the amplifiers and/or a higher bit rate per channel and/or a greater number of WDM channels transmitted.

According to one aspect of the invention, a method is provided for reducing noise in a long distance optical telecommunications system. The method comprises transmitting an optical signal on an optical fiber telecommunications line that comprises optical amplifiers and has a substantially compensated dispersion. The method also includes receiving from the line a noisy optical signal that includes the transmitted optical signal and an optical noise signal. The method encompasses generating an electronic signal correlated with the noisy optical signal. The electronic signal is associated with a quality parameter (Q) that depends on the optical noise signal and distortion of the optical signal. Additionally, the method includes applying to the optical signal a nonlinear phase-shift $e^{i\psi}$ associated with a variation of phase $\psi$ greater than 0.5 radiants, and a normal dispersion $\beta_{2,NORM} \cdot L$, the nonlinear phase-shift and the normal dispersion being operatively selected to increase the quality parameter by at least 1 dB.

According to one embodiment of the present invention, the normal dispersion is less than 500 $ps^2$, less than 200 $ps^2$, or less than 100 $ps^2$.

According to another embodiment of the present invention, the dispersion of the telecommunications line is compensated according to a compensation ratio of between 80% and 120%, between 85% and 115%, or between 90% and 110%.

According to another embodiment of the present invention, the step of transmitting the optical signal comprises the step of transmitting an optical signal carrying coded information, preferably an RZ type optical digital signal.

According to another embodiment of the present invention, the step of applying comprises applying the nonlinear phase-shift, then the normal dispersion.

According to another embodiment of the present invention, the method further comprises applying an anomalous dispersion to the optical signal and the optical noise signal.

According to another embodiment of the present invention, the anomalous dispersion may have a value between −1000 $ps^2$ and 0 $ps^2$, or between −500 $ps^2$ and 0 $ps^2$.

According to another embodiment of the present invention, the method comprises amplifying the optical signal to a pre-established power level.

According to another embodiment of the present invention, the method comprises wavelength filtering the optical signal.

According to another embodiment of the present invention, the method comprises transmitting a plurality of optical signals at different wavelengths and receiving the plurality of optical signals.

According to another embodiment of the present invention, the method comprises separating the optical signals along distinct optical paths, and applying the nonlinear phase-shift and the normal dispersion along one of the optical paths.

According to another embodiment of the present invention, the step of applying is along each of the optical paths.

According to another aspect of the invention, an optical telecommunications system comprises a transmitter that is configured to generate an optical signal. An optical link comprises an optical amplifier that is configured to transmit the optical signal in a pre-established direction of propagation with substantially compensated dispersion to have an associated optical noise. A receiver is configured to receive a noisy optical signal including the transmitted optical signal and an optical noise signal. The receiver comprises a photodetecting device that is configured to generate an electronic signal correlated with the noisy optical signal. The electronic signal is associated with a quality parameter (Q) that depends on the optical noise signal and distortion of the optical signal in the optical link. The optical link further comprises a dispersive and nonlinear filtering device that includes a normal dispersion and nonlinear component. The filtering device is placed along the optical link and has an associated normal dispersion parameter $\beta_{2,NORM} \cdot L$ and a nonlinearity parameter $\gamma$ operatively selected so as to increase the quality parameter by at least 1 dB.

According to another embodiment of the present invention, the optical signal is an RZ type digital signal.

According to another embodiment of the present invention, the normal dispersion and nonlinear component comprises a first nonlinear element and a second normal dispersion element, wherein the first element is disposed upstream of the second element along the direction of propagation.

According to another embodiment of the present invention, the filtering device comprises an anomalous dispersion component that is connected in a cascade fashion with the normal dispersion and nonlinear component and disposed upstream of the normal dispersion and nonlinear component along the direction of propagation.

According to another embodiment of the present invention, the filtering device comprises a first optical amplifier that is configured to amplify the optical signal to a pre-established power level, the first optical amplifier being disposed upstream of the normal dispersion and nonlinear component along the direction of propagation.

According to another embodiment of the present invention, the filtering device comprises a band-pass optical filter.

According to another embodiment of the present invention, the optical link comprises another optical amplifier that is disposed upstream of the filtering device along the direction of propagation and suitable for amplifying the optical signal.

According to another embodiment of the present invention, the system comprises a plurality of transmitters configured to transmit a plurality of optical signals at different wavelengths, and a plurality of receivers configured to receive the optical signals.

According to another embodiment of the present invention, the system comprises an optical signal multiplexing device that is disposed upstream of the optical transmission line along the direction of propagation, and an optical signal demultiplexing device that is disposed downstream of the optical transmission line along the direction of propagation, wherein the filtering device is disposed downstream of the demultiplexing device along the direction of propagation.

According to another embodiment of the present invention, the optical link comprises a chromatic dispersion compensator.

According to another embodiment of the present invention, the normal dispersion and nonlinear component is formed by an optical fiber.

According to another embodiment of the present invention, the first nonlinear element is an optical fiber.

According to another embodiment of the present invention, the first nonlinear element is a semiconductor device.

According to another embodiment of the present invention, the second normal dispersion element is an optical fiber.

According to another embodiment of the present invention, the second normal dispersion element comprises a Bragg grating.

According to another embodiment of the present invention, the anomalous dispersion component is an optical fiber.

According to another embodiment of the present invention, the anomalous dispersion component comprises a Bragg grating.

In yet another aspect of the invention, a device for providing the reduction of noise in a compensated dispersion optical telecommunications system comprises a receiver that is configured to receive a noisy optical signal from a compensated dispersion optical link. The noisy optical signal includes an optical signal and an optical noise signal. The receiver comprises a photodetector that is configured to generate an electronic signal correlated with the noisy optical signal. The electronic signal is associated with a quality parameter (Q) that depends on a level of distortion associated with the noisy optical signal in the optical link. An optical input is configured to optically connect to the optical link. An optical output is configured to being optically connected to the receiver. The optical output comprises a nonlinear component with normal dispersion characteristics that has a normal dispersion parameter $\beta_{2,NORM} \cdot L$ and a nonlinearity parameter $\gamma$ operatively selected so as to increase the quality parameter by at least 1 dB.

BRIEF DESCRIPTION OF THE DRAWINGS

Further details may be discerned in the description that follows, which refers to the accompanying Figures listed below:

FIGS. 2a and 2b illustrate two possible embodiments of a device for the reduction of noise in the system shown in FIG. 1;

DESCRIPTION OF THE PREFERRED EMBODIMENTS

Figure 1:
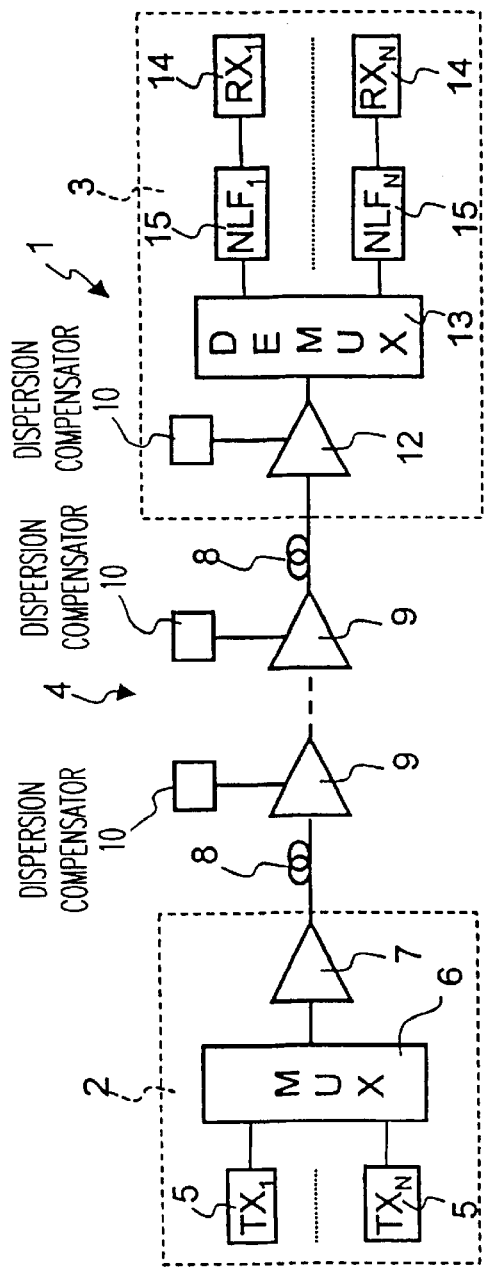
FIG. 1 illustrates in schematic, simplified form an optical transmission system produced according to an embodiment of the present invention.

FIG. 1 illustrates in schematic and simplified form a WDM type optical transmission system 1, suitable for the long-distance transmission (for example, hundreds of kilometers) of optical signals on a plurality of transmission channels, each channel being associated with a respective wavelength within the transmission wavelength band.

The system 1 comprises a transmitting unit 2 suitable for transmitting optical signals, for example RZ type signals formed by solitonic pulses, a receiving unit 3 for receiving these signals and an optical transmission line 4 optically connecting the transmitting and receiving units 2, 3 to each other.

The transmitting unit 2 comprises N optical transmitters 5 ($TX_1, \ldots, TX_N$), a multiplexer 6 (i.e., a signal combining device, indicated MUX in abbreviated form) and a power amplifier 7.

Each of the transmitters 5 is associated with a respective channel and is therefore suitable for transmitting a respective solitonic signal at a respective wavelength. The transmitters 5 are suitable for transmitting signals having a predetermined pulse repetition frequency (expressed in Gbit/s) and pulse duration (expressed in ps). For the purposes of this invention, by "duration" of a pulse is meant its total duration at half height, known in the sector art as $T_{FWHM}$ (Full Width at Half Maximum). Typically the duration of the pulses is sufficiently less than the bit period (coincident with the inverse of the pulse repetition frequency) to avoid contiguous pulses from interacting along the line. The transmission frequency could, for example, be 2.5 Gbit/s, 10 Gbit/s or 40 Gbit/s, but frequencies less than or greater than these may also be considered.

Each of the transmitters 5 may, for example, comprise, in a way not depicted, a continuous emission laser, a first amplitude modulator, for example of the Mach-Zehnder interferometer type, for generating, from the radiation emitted by the laser, solitonic pulses of pre-established amplitude and at a pre-established bit rate, and a second amplitude modulator, for example also of the Mach-Zehnder interferometer type, for modulating the train of solitonic pulses with the information to be transmitted. In practice, a digital signal is obtained at the output of the second modulator, in which signal, in the period corresponding to one bit, the presence of the solitonic pulse identifies a bit at level "1" and the absence of the solitonic pulse identifies a bit at level "0". In place of the continuous emission laser and the first modulator, according to alternative known techniques, a direct modulation laser, preferably of low-chirp type, may be used, or a mode-locked laser suitable for emitting pulses with the characteristics required.

The information coded on the signals generated by the transmitters 5 may be supplied to the transmitters 5 in question in electronic format or in optical format. The latter situation (information in optical format) is the case, for example, when the transmitting unit 2 receives optical signals from a further optical device or from an optical transmission line other than that of FIG. 1, and accordingly transmits on the line 4 optical signals carrying in code form at least part of the information received and having characteristics suitable for transmission on the line 4 itself. In the case where the digital signals (supplied by the transmitters 5 or coming from a different transmission line) have different characteristics (such as, for example, wavelength, data frequency and/or format) from those required of the optical transmission line of FIG. 1, the optical transmission system preferably also comprises interfacing units suitable for receiving the digital optical signals and adapting them to the characteristics required of the optical transmission line. For example, the interfacing units output optical signals having wavelengths within the useful working band of the optical amplifiers arranged cascade fashion along the optical transmission line.

In U.S. Pat. No. 5,267,073, filed by the Applicant, interfacing units are described comprising in particular a transmission adapter, suitable for converting an input optical signal into a form suitable for the optical transmission line, and a reception adapter, suitable for reconverting the transmitted signal back into a form suitable for a receiving device.

The multiplexer 6 is suitable for receiving the N signals from the optical transmitters 5 ($TX_1, \ldots, TX_N$), and for feeding them to a single output in order to generate a single WDM signal. The multiplexer 6 is a passive optical device, generally comprising fused-fiber, planar-optics, microoptics and similar type couplers. By way of example, multiplexers suitable for the designated purpose are marketed by E-TEK DYNAMICS INC.

The power amplifier 7 is suitable for receiving the signals from the output of the multiplexer 6 and for elevating their power level to a value sufficient to travel along a subsequent stretch of optical fiber located before new amplifying means, and for guaranteeing the required transmission quality. By power amplifier is meant an amplifier operating under conditions of saturation, in which the output power depends on the pumping power.

In a preferred embodiment thereof, the line 4 comprises a number of spans of optical fiber 8 suitable for covering the desired distance, optical line amplifiers 9 alternating with the optical fiber spans 8 and dispersion compensators 10.

The spans of optical fiber 8 (each for example about one hundred kilometers long) are preferably of monomodal type, to convey the WDM signal over long-distances. The fiber used for the optical fiber spans 8 is preferably a fiber with a high chromatic dispersion value, for example a step-index type, single mode fiber (SMF) with a chromatic dispersion zero of about 1300 nm, but may also alternatively be another type of fiber permitting the propagation of RZ signals, in particular of solitonic or almost solitonic pulses, such as for example a dispersion shifted (DS) type fiber or a nonzero dispersion (NZD) type fiber.

Each optical line amplifier 9 is placed between one span of fiber 8 and the next, to supply the signal with the optical power lost on account of the inevitable attenuation occurring in the fibers. The line amplifiers 9 are, for example, erbium doped fiber optical amplifiers (preferably with various stages) suitable for outputting a total power commensurate with the number of WDM channels to be transmitted. Preferably the optical amplifiers are capable of outputting a total power of at least 20 dBm. Typically the amplifiers are capable of operating in a sub-band of the 1530–1565 nm wavelength band. Preferably the amplifiers are capable of operating in the entire 1530–1565 nm wavelength band, and more preferably in the 1530–1600 nm extended band. Amplifiers suitable for use in the system 1 are made, for example, by the Applicant.

The line amplifiers 9, as also the power amplifier 7, as well as providing amplification of the WDM signal, are sources of amplified spontaneous emission (ASE) noise, which is propagated along the line together with the WDM signal. This optical noise tends to increase by the effect of the different amplifiers present along the line and, accordingly, to reach its maximum intensity at the end of the line in question.

The dispersion compensators 10 are represented as rectangles arranged at the optical line amplifiers 9. In practice, each dispersion compensator 10 may be disposed inside a respective amplifier (for example, in the case of multi-stage amplifiers, between one amplification stage and the next), upstream or downstream of the amplifier itself or, as an additional alternative, at an intermediate point of the line between two successive amplifiers. Each dispersion compensator 10 is traversed by the transmitted signal and is suitable for compensating a pre-established percentage (defined by the ratio of compensation RC) of the chromatic dispersion accumulated by the signal. The dispersion compensators 10 may comprise, for example, stretches of predetermined length of dispersion compensating fiber (as described for example in U.S. Pat. No. 5,361,319), or one or more stretches of fiber bearing a grating with non-constant pitch (chirped) connected in the line through a circulator, a coupler or the like, in order to reflect in suitable time sequence the different spectral components of the signal, as described for example in U.S. Pat. No. 4,953,939. One technique for producing chirped gratings suitable for use in this invention is described, for example, in the patent application WO 98/08120, filed by the Applicant. The function of each compensator is that of causing a change in the time profile of the pulses opposite to that caused by the optical fibers of the line and of a size such as to compensate their distortion to a substantial extent.

The receiving unit 3 comprises a pre-amplifier 12, a demultiplexer 13 (indicated with DEMUX), N nonlinear filters 15 made according to the invention, and N optical receivers 14. Here and in the following, by "nonlinear filter" is meant a device with nonlinear and dispersive characteristics suitable for filtering the optical noise transmitted simultaneously with the signal. More particularly, the "nonlinear filter" of an embodiment of the present invention is a device suitable for exploiting dispersive and nonlinear phenomena to produce a reduction of the noise component in phase with the signal. Accordingly, on the basis of the above, a reduction is obtained of the noise present in the signal received.

The pre-amplifier 12 is suitable for receiving the 30 signal from the last span of optical fiber 8 of the line 4 and for amplifying it to a power level that depends both on the losses of power expected in the demultiplexer 13 and in the nonlinear filters 15 and also on the power required to have a correct reception on the receivers 14. In particular, the pre-amplifier 12 is suitable for elevating the power of the signal to be fed to the receivers 14 to a value suitably greater than the sensitivity threshold of the receiver itself (for example, from −26 dBm to −11 dBm at the input of the receivers), at the same time introducing as little noise as possible and maintaining the equalization of the signals. The pre-amplifier 12 is, for example, an erbium doped fiber optical amplifier with one or more stages. The pre-amplifier 12 is also a source of amplified spontaneous emission (ASE).

The demultiplexer 13 may be made with any of a multiplicity of technologies and is suitable for separating the N channels received, at respective wavelengths, onto N different outputs. For example, the demultiplexer 13 may comprise Bragg grating or interferential type signal dividers and filters or, alternatively, may comprise Arrayed Waveguide Grating devices (AWG).

Each optical receiver 14 ($RX_1, \ldots, RX_N$) comprises a photodetector (not depicted) connected to a respective output of the demultiplexer 13 for receiving a respective signal together with the optical noise generated by the amplifiers of the system 1 and for accordingly generating an electronic signal correlated with both the optical signal and the optical noise received. Associated with each electronic signal is a quality parameter or factor Q, defined below, which depends on the level of the optical noise (in particular that defined by the amplified stimulated emission of the amplifiers) and on the distortion suffered by the optical signal during transmission. The information contained in the electronic signals generated by each optical receiver may be used as it is, or may be supplied to a regenerating unit (not depicted) for the modulation of further optical signals having predefined parametrical characteristics.

Preferably the receiving unit 3 also comprises a dispersion compensator 10, for example of the same type as those placed along the line 4, arranged at the preamplifier 12.

The system 1 may also comprise devices for the extraction and/or insertion of signals of known type (not depicted) disposed for example along the line 4, in which case the number of channels received may be different from the number of channels transmitted and, therefore, the number of receivers 14 may be different from the number of transmitters 5. Without any sacrifice to the general nature, it will be supposed here and in the following that the number of receivers 14 is the same as the number of transmitters 5 and that it is therefore possible to define an optical link between each of the receivers 14 and a corresponding transmitter 5. This link comprises the multiplexer 6, the amplifier 7, the line 4, the pre-amplifier 12 and the demultiplexer 13. The nonlinear filters 15, ($NLF_1$, . . . , $NLF_N$) are each disposed between a respective output of the demultiplexer 13 and a respective receiver 14.

Illustrated in FIG. 2a is a preferred embodiment of a nonlinear filter 15. The nonlinear filter 15 comprises an optical input 16 for input of the signals, an optical output 17 for output of the signals, a first nonlinear and normal dispersion component 18 and, preferably but not necessarily, a second anomalous dispersion component 19, disposed upstream of the component 18 with respect to the direction of propagation of the signals, that is to say placed between the input 16 and the component 18. This anomalous dispersion component 19 preferably has a negligible nonlinearity and comprises, for example, a chirped grating or an anomalous dispersion optical fiber.

For the purposes of this invention, by "nonlinear component" or "component having nonlinearity" is meant an optical device suitable for determining, in an optical signal passing through it, a nonlinear phaseshift $e^{i\psi}$ in which the variation of phase $\psi$ expressed in radiants is greater than 0.5. Preferably, said nonlinear phase-shift is greater than 1 radiant, and still more preferably greater than 2 radiants.

Preferably, though not necessarily, the filter 15 also comprises a band-pass optical filter 20 of known type, having a passband centered on the wavelength of the signal, and an optical amplifier 21 also of known type, arranged cascade fashion between the input 16 and the second component 19. Preferably the optical amplifier 21 is comprised of the pre-amplifier of the optical telecommunications system.

The first component 18 is operatively selected in such a way as to reduce the noise component in phase with the signal, on the basis of the modulation instability phenomenon in normal dispersion described previously.

The second component 19, where present, is operatively selected in such a way as to reoptimize the shape of the signal pulses, i.e., to reduce the distortion of the pulses in question at the end of the transmission line.

The placing of the second component 19 upstream of the first component 18 is important for the attainment of the desired noise filtering effect. This is because an anomalous dispersion component produces a redistribution of the noise between the two in-phase $n_F$ and in-quadrature $n_Q$ components sufficient to restore substantially the equilibrium between the power of the components. If it is located upstream of the first component 18, the anomalous dispersion component 19 receives an input noise with in-phase $n_F$ and in-quadrature no contributions of like amount (on average). The effect of the redistribution does not alter this situation of equilibrium, and the sole contribution of the anomalous dispersion component is that of reducing the distortion.

On the other hand, if the anomalous dispersion component 19 were to be located downstream of the component 18, it would receive at the input radiation in which the in-phase noise $n_F$ is squeezed with respect to the in-quadrature noise $n_Q$. In this case, the effect of the component 19 would be an undesirable redistribution to the in-phase component of part of the in-quadrature noise and, therefore, the filtering action of the component 18 on the in-phase component $n_F$ would at least in part be cancelled.

The first component 18 preferably comprises an optical fiber with high nonlinear effect and normal dispersion type operation. A number of characteristic parameters are associated with the optical fiber considered, in particular the coefficient of nonlinearity $\gamma$ (expressed in $W^{-1} \cdot km^{-1}$), the coefficient of attenuation a (expressed in $dB \cdot km^{-1}$), the length $L_{18}$ of the fiber itself (expressed in km) and the coefficient of dispersion $\beta_2$ (expressed in $ps^2 \cdot km^{-1}$). In the case in hand, the coefficient of dispersion $\beta_2$ of the first component 18 will be indicated here and in the following as $\beta_{2,NORM}$ and called "coefficient of normal dispersion" to indicate that the same first component 18 is working under normal dispersion conditions.

The parameter $\beta_2$ is used to characterize an optical component in terms of dispersion and represents the coefficient of the second order of the expansion in Taylor series of the propagation constant $\beta$. For a signal having a central frequency $\psi_0$, the series expansion is expressed as follows:

$$\beta(\omega) = n(\omega) \cdot \omega/c = \beta_0 + \beta_1(\omega-\omega_0) + 1/2\beta_2(\omega-\omega_0)^2 + \ldots$$

It may be demonstrated that, for a wavelength $\lambda$, the parameter $\beta_2$ is given by:

$$\beta_2 = \frac{\lambda^3}{2\pi c^2} \frac{d^2 n}{d\lambda^2}$$

where n is the index of refraction and c the speed of light. As well as with the parameter $\beta_2$, the dispersion characteristics of a fiber may also be described using the dispersion parameter D (expressed in $ps \cdot nm^{-1} \cdot km^{-1}$) linked with the parameter $\beta_2$ by the relation:

$$D = -\frac{2\pi c}{\lambda^2} \cdot \beta_2.$$

A fiber with normal dispersion is characterized by a positive $\beta_2$ value and, therefore, by a negative value for D, whereas a fiber with anomalous dispersion is characterized by a negative $\beta_2$ value and, therefore, a positive value for D.

In the current technical art, the coefficient of nonlinearity $\gamma$ is generally approximated by way of the expression:

$$\gamma = \frac{2\pi n_2}{\lambda A_{eff}}$$

where $n_2$ is the index of nonlinear refraction of the fiber, $A_{eff}$ is the effective area of the fiber and $\lambda$ is the wavelength of the optical radiation considered.

The condition expressed in the definition of nonlinearity, $\psi > 0.5$, represents a constraint on the selection of the characteristic parameters of the nonlinear component 18. In point of fact, the phase is linked with the characteristic parameters of the component 18 by the following relation:

$$\psi = \gamma \cdot P \cdot L_{eff}$$

where $\gamma$ is the already stated coefficient of nonlinearity (expressed in $W^{-1}.km^{-1}$), P the average power of the signal per channel (expressed in W) and $L_{eff}$ is the effective length of the fiber (expressed in km). The effective length of the fiber $L_{eff}$ may in turn be expressed as follows:

$$L_{eff} = \frac{1 - e^{-\alpha L}}{\alpha}$$

where $\alpha$ is the already stated coefficient of attenuation associated with the component, in this case expressed in $km^{-1}$.

The above condition is for example satisfied by an optical fiber having a coefficient of nonlinearity $\gamma$ of 20 $W^{-1}$ $km^{-1}$, an average signal power P of 10 mW and an effective length $L_{eff}$ of 5 km.

The values for dispersion $\beta_{2,NORM}$ and nonlinearity (nonlinear phase-shift $\psi$) of the component 18 are operatively selected, in the absence of the anomalous dispersion component 19, in such a way as to obtain an increase by at least 1 dB of the quality parameter Q of the transmission system with respect to the case where the component 18 is missing. For the purposes of a practical application of this invention, the average value of $\beta_{2,NORM} \cdot L$ along the component 18 is greater than 0 $ps^2$ and less than 500 $ps^2$. This is because the Applicant has observed that, in practice, for a wide selection of operating conditions (bit rate, length of the communication line, nonlinear phase-shift $e^{i\psi}$ of the nonlinear filter, etc.), values of $\beta_{2,NORM} \cdot L$ greater than 500 $ps^2$ cause an excessive distortion of the signal and a deterioration, rather than an improvement, of the Q factor.

Preferably the average value of $\beta_{2,NORM} \cdot L$ is less than 200 $ps^2$. Still more preferably, $\beta_{2,NORM} \cdot L$ has an average value of less than 100 $ps^2$.

The Applicant has found that, on account of the relatively high values of the nonlinearity coefficient of the component 18 and of the optical power within it, the component 18 may be subject to Stimulated Brillouin Scattering (SBS). The effects of this phenomenon can be compensated, according to known techniques, for example by dithering of the wavelength of the optical signal around the central wavelength or, in the case where the component 18 comprises an optical fiber having high nonlinearity, by interrupting the transmission of Brillouin effect backscattered radiation by means of optical isolators arranged along the optical fiber itself either at regular intervals or, preferably, at a distance gauged in relation to the optical power along the flare. According to another technique, SBS may be reduced by producing a nonlinear (and, as necessary, normal dispersion) optical fiber for the component 18 starting from a preform obtained by overlaying a succession of "discs" having a refractive index profile corresponding to the optical properties desired but made of different materials, so that their elastic characteristics are mutually different. Starting from a preform of this type, it is possible to obtain by drawing an optical fiber with elastic characteristics that vary along this fiber, so that the coherence of the acoustic signals along the fiber can be interrupted and the SBS significantly reduced.

The second component 19 preferably comprises a fiber operating in the anomalous dispersion region and, preferably, under conditions of linearity, and its characteristic parameters are the coefficient of attenuation $\alpha$, the length $L_{19}$ and the coefficient of dispersion $\beta_2$, here and in the following indicated with $\beta_{2,ANOM}$ and called "coefficient of anomalous dispersion" to indicate that the same second component 19 is operating in the anomalous dispersion region. The values of the parameters, in particular the coefficient of dispersion $\beta_{2,ANOM}$ and the length $L_{19}$ are selected such as to reduce distortion of the signal. In particular, typical values for the product $\beta_{2,ANOM} \cdot L_{19}$ range between $-1000$ $ps^2$ and 0 $ps^2$, preferably between $-500$ $ps^2$ and 0 $ps^2$. Alternatively, the second component 19 comprises an anomalous dispersion chirped grating, having characteristics suitable for reducing the signal distortion, as indicated above.

Illustrated in FIG. 2b is a different possible embodiment of the nonlinear filter, indicated here as 15'. The filter 15' differs from the filter 15 in that it includes a first component 18' comprising two separate elements 18'a and 18'b, the first of which (18'a) has predominantly nonlinear characteristics and the second of which (18'b) has predominantly normal dispersion characteristics. The order in which the two elements 18'a and 18'b are arranged in series is important because if the order is switched with respect to that indicated above, there is no longer the desired filtering effect but instead an undesirable distortion of the signal. In fact, if the nonlinear element 18'a were to be placed downstream of the dispersive element 18'b, the contribution of the element 18'a, identifiable as a phase-shift $e^{i\psi}$ applied to the signal, would be cancelled by the "square module" operation effected by the photodetector at the end of the telecommunications system.

The first element 18'a is, preferably, an optical fiber (as shown in FIG. 2b) with a very high nonlinear effect at the chromatic dispersion zero and under conditions of high signal power and its characteristic parameters are the coefficient of nonlinearity $\gamma$, the coefficient of attenuation $\alpha$ and the length $L_{18'a}$. The second element 18'b is, preferably, a normal dispersion optical fiber (as shown in the FIG. 2b). Following the attenuation by the element 18'a the fiber 18'b operates preferably under conditions of nonlinearity (low power). Its characteristic parameters are the coefficient of normal dispersion $\beta_{2,NORM}$, the coefficient of attenuation $\alpha$ and the length $L_{18'b}$.

The other parts of the filter 15' are the same as the corresponding parts of the filter 15 and are therefore indicated using the same numerals for reference.

The condition of phase-shift expressed in the definition of nonlinearity may easily be extended to the case of the component 18', considering the characteristic parameters of the first element 18a'.

The values for nonlinearity (nonlinear phase-shift $\psi$) of the element 18'a and of dispersion $\beta_{2,NORM}$ of the element 18'b are operatively selected, in the absence of the anomalous dispersion component 19, such as to increase by at least 1 dB the quality parameter Q of the transmission system with respect to the case where the component 18' is not used.

The filtering effect of the nonlinear filter 15 (or 15') on the signal passing through it may be described as follows. The band-pass filter 20 isolates the signal and noise contributions at the wavelength of interest, eliminating the signal and noise contributions at the other wavelengths. In practice, in the case of the i-th channel, the band-pass filter 20 of the i-th nonlinear filter $NFL_i$ permits only the optical radiation at the wavelength $\lambda_i$ to pass. The amplifier 21 receives the filtered signal from the filter 20 and amplifies it to a desired power level P.

The signal is then received by the anomalous dispersion component 19, which reduces the signal distortion, restoring it—partly at least—to its original form. The signal accordingly corrected then comes to the component 18 (or the component 18' in the case of the filter 15'), wherein, because of the effects of modulation instability (the amount of which is dependent on the nonlinearity and dispersion characteristics of the component 18 itself), the noise component $n_F$ in phase with the signal is reduced. If, as in the case in FIG. 1, the signal output from filter 15 (or 15') is received by a photodetector, the electronic signal successively generated has a low noise level, as the phenomenon of beating between the signal and the in-phase noise component $n_F$ is reduced.

Figure 3:
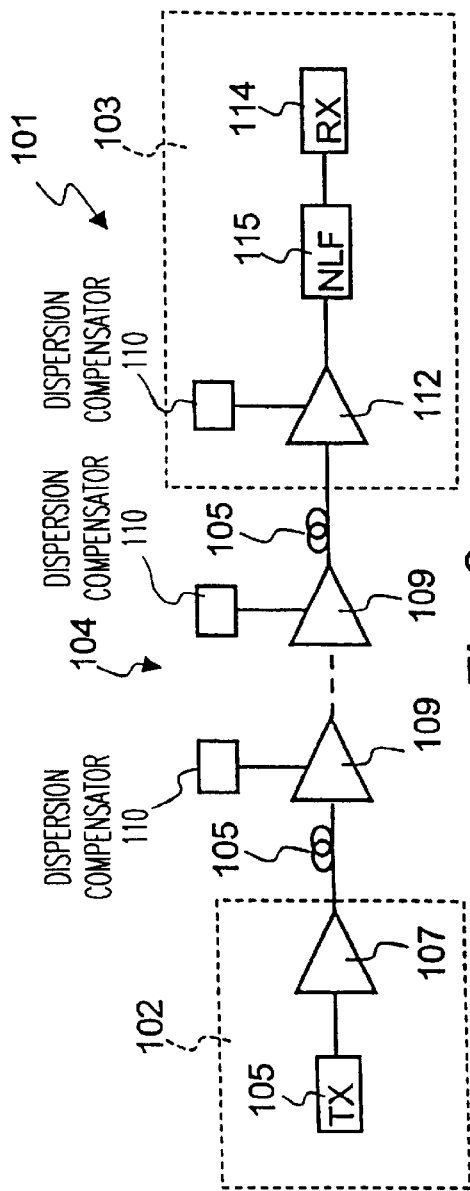
FIG. 3 illustrates an optical transmission system used for digital simulations according to an embodiment of the present invention.

To verify the filter effect of the nonlinear filter 15 on the performance of the transmission system 1, digital simulation measurements were made by examining a simplified transmission system, illustrated in FIG. 3 and indicated with the numeral 101, suitable for transmitting on a single wavelength ($\lambda$=1550 nm). The transmission system 101 includes a transmitting unit 102, in turn comprising a transmitter 105 and a power amplifier 107, a transmission line 104, in turn comprising five spans of fiber 105, each 100 km long, and four line amplifiers 109, and a receiving unit 103, in turn comprising a pre-amplifier 112, a band-pass optical filter 116, a nonlinear filter 115 and an optical receiver 114. The nonlinear filter 115 is of the type illustrated in FIG. 2a or of the type illustrated in FIG. 2b.

The transmission system 101 also comprises five dispersion compensators 110, of which four are placed each in correspondence with a respective line amplifier 109 and the remaining one in correspondence with the pre-amplifier 112.

In the simulations, the coefficient $\alpha$ of attenuation of the signal of the spans of fiber 105 was taken to be 0.25 dB km$^{-1}$ and the signals transmitted by the transmitter 105 were taken to be solitonic pulses at a single wavelength ($\lambda$=1550 nm) with a bit rate of 10 Gbit/s and a time duration (FWHM) of 35 ps. The power of the transmitter 105 and the gain of the amplifiers 107, 109 were fixed so as to have an average power of the signal output from each line amplifier 109 of about 10 mW. In addition, an optical filter 116 was selected having a band width of 0.5 nm.

Inside the receiver 114 is an electric filter (not depicted), for example a Bessel-Thompson type IVth order filter having an electric band width of 7.5 GHz, permitting frequency filtering of the electronic signals generated by the receiver 114.

With digital transmissions, the quality of the signal received is generally assessed by considering a quality parameter, called the "Q factor" (defined, for example, in the previously cited article by Hui et al., "Modulation Instability and Its Impact in Multispan Optical Amplified IMDD Systems: Theory and Experiments"), which takes into account both the noise and the distortion associated with the signal. In practice, the higher the value of Q, the better the quality of the signal in terms of noise and distortion. The Q factor is correlated with the Bit Error Rate (BER), which expresses the frequency with which a bit of information is received incorrectly.

Figure 4A:
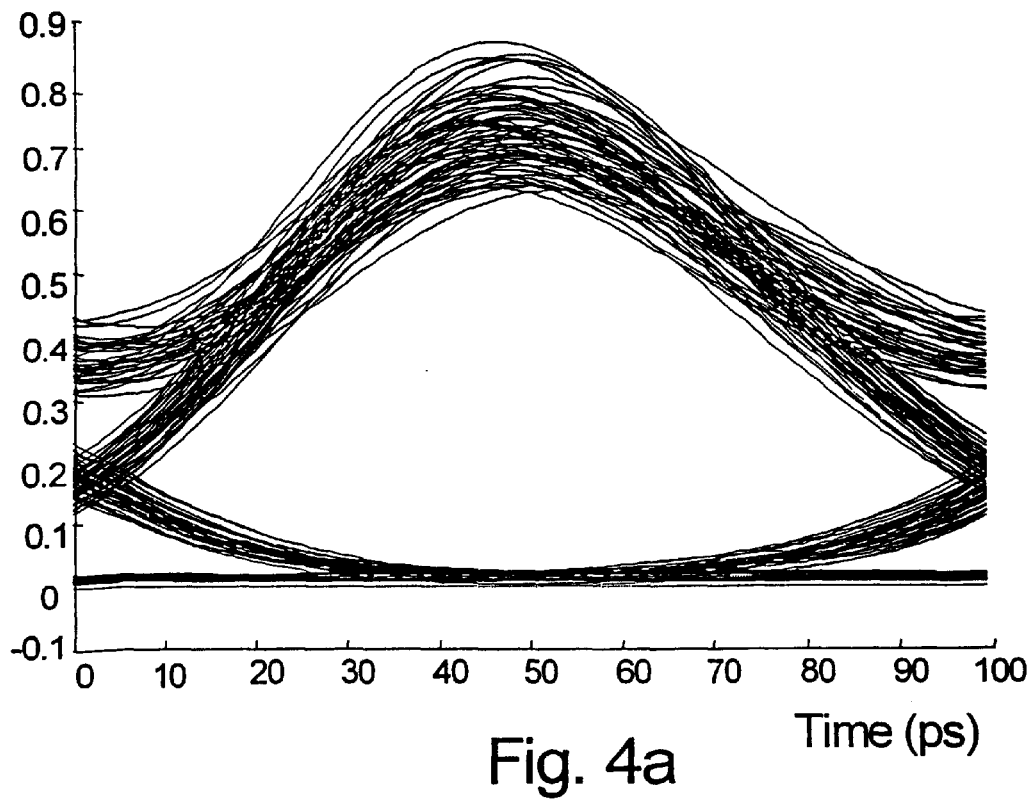
FIGS. 4–13 illustrate the results of digital simulations regarding the transmission of signals in the system of FIG. 3.

Consider the diagram of FIG. 4a (which, in the art of digital transmissions, is commonly known as an "eye" diagram), which illustrates the form of the signal received by the receiver 114 in the case of transmission in the absence of fibers 105 and dispersion compensators 110, replaced by attenuators of like attenuation, and in the absence of the nonlinear filter 115. In this diagram, the signal is overlaid with noise originating, in part at least, from the radiation of the spontaneous emission (ASE) of the amplifiers 107, 109, 112. Downstream of the receiver 114, the ASE component in phase with the signal tends to generate, on the basis of the phenomena described earlier, beatings with the signal received which give rise to undesirable electronic noise. This noise, most manifest on the bits at level 1, reduces the quality of the signal and, therefore, worsens the BER value. The Q factor may be derived from the approximated expression:

$$Q[dB] = 10 \log_{10} \frac{m_1 = m_0}{\sigma_1 + \sigma_0}$$

where $m_1$ and $\sigma_1$ are the average value and the standard deviation of the signal on level 1 at the point of maximum aperture of the eye diagram, and $m_0$ and $\sigma_0$ are the same values associated with level 0.

Figure 4B:
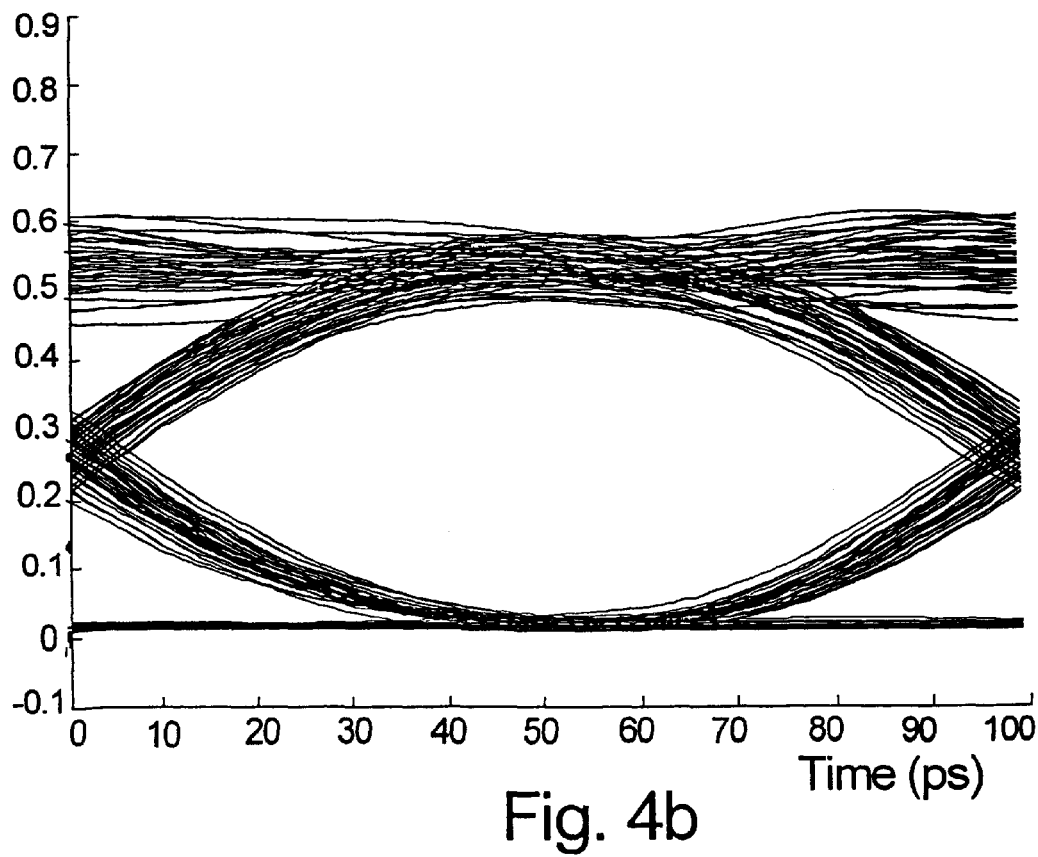

FIG. 4b illustrates the eye diagram for the signal detected by the receiver 114 in the case of transmission in the absence of fibers 105 and dispersion compensators 110, replaced by attenuators of like attenuation, but in the presence of the nonlinear filter 115, of the type of FIG. 2a or FIG. 2b. The signal received has a lower noise level than that of the previous case, in particular at level "1". The nonlinear filter 115, however, produces a distortion of the signal and a reduction in amplitude of the eye diagram, because the signal curve relative to a bit at level "1" undergoes a flattening and tends to approach the curve relative to a bit at level "0".

In practice, as demonstrated by the simulations reported in FIGS. 4a and 4b, if the nonlinear filter 115 is not included, the eye diagram generated by the receiver 114 shows the presence of a definite strip of noise overlaid on the signal, in particular on the "1" level (where there is beating between signal and noise) and less evident on the "0" level (where there is beating of the noise with itself alone). When the nonlinear filter 115 is included, on the other hand, the strip of noise overlaid on the "1" symbols is greatly reduced, whereas that on the "0" symbols remains practically unchanged. This reduction in noise is obtained at the cost of a signal distortion such that the pulse relative to the "1" symbol practically takes the form of an NRZ signal. Beyond this distortion threshold, the "tails" of the level "1" bit curve, i.e., those portions of the curve in proximity with the bit's time slot borders, would become excessive, flowing into the time slot of the adjacent bit and giving rise to what is known as "intersymbol interference". As will be demonstrated below, the insertion of a suitably selected filter 115 results in a reduction of the noise overlaid on the signal, the positive effects of which on the Q factor and, accordingly, on the BER, are greater than the negative effects due to the additional distortion.

From the diagrams in FIGS. 4a and 4b, it may also be deduced that the filtering technique of the invention is less effective in the case of transmission of NRZ signals. This is because, in this case, the signal received would be of the type shown in FIG. 4b already in the absence of the filter 115, and the insertion of the filter 115 would result in a further downward slanting of the curve of the "1" symbol, i.e., a distortion effect such that the BER would become excessive. The typical form of the NRZ signal therefore defines a limit for the distortion acceptable in the case of RZ signals, beyond which each bit tends to flow over into the time slots of the adjacent bits generating interference with the latter-named. In short, beyond this limit the positive effects on Q due to the reduction of the noise overlaid on the signal are counterbalanced by the negative effects on Q due to distortion of the signal.

FIGS. 5–13 illustrate the results of digital measurements suitable for simulating the transmission of signals in the system 101 of FIG. 3 and for establishing how the various characteristic parameters of the nonlinear filter 115 act on the received signal quality (measured by the Q factor). In order to obtain results that were suitable for comparison, when conducting the simulations, it was assumed that the noise contribution to the system was always the same. The values reported are, for each simulation, the result of a mean made on 160 samples obtained.

The method of procedure for the simulations was as follows. The transmission of a solitonic signal was simulated in the system 101, without the nonlinear filter 115, measuring the parameter Q associated with the electronic signal subsequently obtained; this value for Q defines a reference value $Q_0$. The transmission was then repeated after inserting, upstream of the receiver 114, a dispersion compensator operating under linear conditions, selected in such a way as to maximize the value of Q, thus obtaining a value $Q_1$ greater than $Q_0$. Finally, each normal dispersion, linear-operation dispersion compensator was replaced by a filter operating under nonlinear conditions, also selected in such a way as to maximize the value of Q, thus obtaining a value $Q_2$ greater than $Q_0$. The results of the simulations demonstrate that the value of $Q_2$ is greater than the value $Q_1$, thus demonstrating that the technique of the invention is suitable for improving performance of the system to an extent greater than conventional techniques.

The results of the simulations are presented below. A first simulation (the results of which are not shown graphically) was conducted, assuming the nonlinear filter 115 to be absent and assuming all the possible nonlinearity and dispersion contributions in the transmission system 1 to be null. These conditions were obtained by replacing the spans of fiber 105 with attenuators suitable for providing the same signal attenuation as that provided by the spans of fiber 105. Under these conditions, a reference value was obtained for Q ($Q_{REF}$) of 22.8 dB. The value of $Q_{REF}$ is used as the term of comparison for assessment of the results of the subsequent simulations.

In a second simulation (the results of which are not shown graphically), the effects of nonlinearity and dispersion generated along the line were considered and an evaluation made of how the Q factor varies with variation of the ratio of compensation RC of the dispersion compensators 110, again in the absence of the nonlinear filter 115. In particular, four different values of RC were considered and more precisely, 87%, 91%, 95% and 99%. The results obtained are shown in Table 1 below:

TABLE 1

| RC (%) | Q (dB) |
|---|---|
| 87 | 20.26 |
| 91 | 21.45 |
| 95 | 21.48 |
| 99 | 20.76 |

As the results of Table 1 demonstrate, in the second simulation, closer than the first simulation to the situation of a real transmission, the value Q of the received signal, corresponding to the value $Q_0$ discussed above, is lower than the value of $Q_{REF}$. This worsening of performance is due both to a "closing" of the eye diagram caused by the effects of signal distortion, and to nonlinear interactions between the noise and the signal along the line (which give rise to anomalous dispersion modulation instability).

A third simulation was performed to assess the possibility of improving the signal quality by introducing in the system 101, without the nonlinear filter 115, a linear dispersive element (not depicted) placed immediately upstream of the receiver 114. In particular, the presence upstream of the receiver 114 of a span of optical fiber 10 km long having negligible nonlinearities was considered. This span of fiber represents a dispersion compensator of a type commonly used in optical transmission systems.

Figure 5:
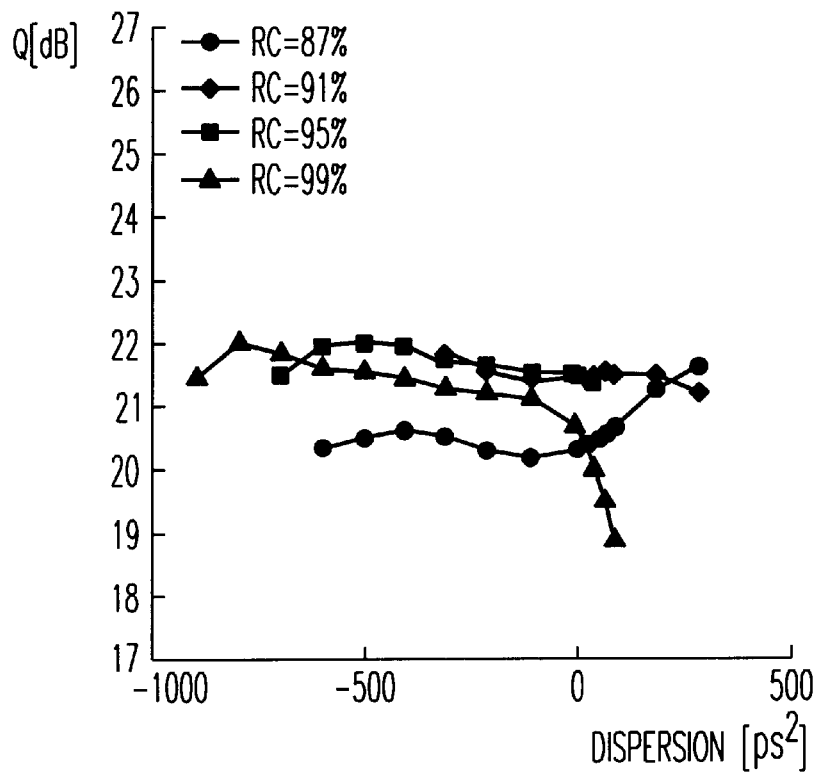

Upon variation of the dispersion of this span of fiber, the Q factor varies as illustrated in FIG. 5, in which the dependence is illustrated for the four values of RC already considered above. Shown in TABLE 2 below, for each value of RC, is the maximum value measured for Q, corresponding to the value $Q_1$ discussed above.

TABLE 2

| RC (%) | Q(dB) |
|---|---|
| 87 | 21.63 |
| 91 | 21.97 |
| 95 | 22.02 |
| 99 | 22.04 |

The results in Table 2 demonstrate how the addition of a linear dispersion component at the end of the transmission line permits an improvement of the received signal quality. Nonetheless, the values obtained for Q are still below those of $Q_{REF}$.

The simulations presented below are relative to the introduction of various configurations of nonlinear filter 115, and the values of Q found define the value $Q_2$ discussed above.

Figure 6:
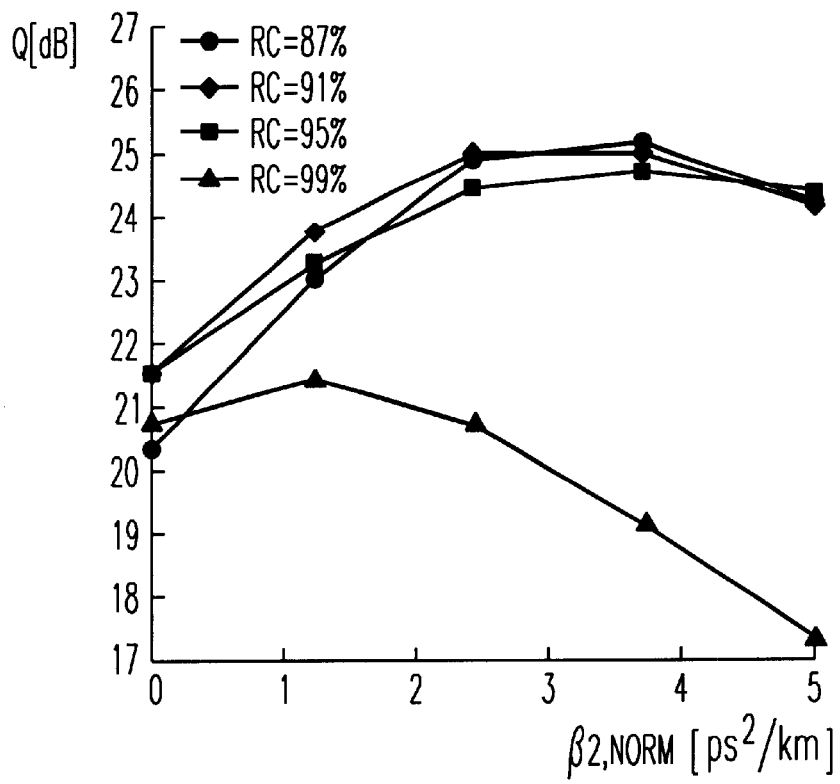

In particular, a fourth simulation was performed in order to assess the effects on the Q factor of the introduction in the system 101 of a nonlinear filter 115 of the type shown in one of the two FIGS. 2a and 2b but without the anomalous dispersion component 19, that is to say a nonlinear filter comprising only the filter 20, the amplifier 21 and a normal dispersion and nonlinear component 18. In practice, the presence was considered upstream of the receiver 114 of a nonlinear filter 115 comprising a span of fiber 10 km long (assumed without losses), the coefficient of nonlinearity γ of which was considered fixed and equal to 80 $W^{-1}$ $km^{-1}$ and the coefficient of dispersion $\beta_{2,NORM}$ of which was made to vary in order to determine its influence on the Q factor. Shown in FIG. 6, for each of the RC values considered, is the dependence of Q on the coefficient of dispersion $\beta_{2,NORM}$, whereas the maximum values of Q detected for each of the four curves of FIG. 6 are listed in Table 3 below, together with the values of the coefficient of dispersion $\beta_{2,NORM}$ in correspondence with which these maximum values of Q were detected.

TABLE 3

| RC (%) | γ ($W^{-1}$ $km^{-1}$) | $\beta_{2,NORM}$ ($ps^2$ $km^{-1}$) | Q (dB) |
|---|---|---|---|
| 87 | 80 | 3.75 | 25.19 |
| 91 | 80 | 3.75 | 25.03 |
| 95 | 80 | 3.75 | 24.77 |
| 99 | 80 | 1.25 | 21.43 |

As observed in Table 3, there is an improvement in the signal quality with respect to the reference measure for all the RC values considered, except for RC=99%. This is due to the fact that, in this case, the signal is propagated on the line in conditions of overcompensation with RC being practically equal to 100% (in the case of the anomalous dispersion fiber, RC must preferably be below 100%), and therefore, reaches the end of the line with extremely pronounced distortion. As a result of the further distortion introduced by the nonlinear filter 115, the improvement is less than in the other cases.

In a fifth simulation, the effect was assessed on the signal of the presence of a nonlinear filter 115 of one of the types shown in FIGS. 2a and 2b, i.e., of a nonlinear filter comprising, in addition to the normal dispersion and nonlinear component 18 discussed above, also the anomalous dispersion component 19. The coefficient of nonlinearity of the normal dispersion component was maintained fixed and equal to $\gamma=80$ $W^{-1}$ $km^{-1}$, whereas the coefficients of dispersion $\beta_{2,NORM}$ and $\beta_{2,ANOM}$ of the normal dispersion component and the anomalous dispersion component were made to vary in order to assess the dependence of Q on these parameters. In practice, in a first set of measurements (the results of which are not shown graphically) only the value of $\beta_{2,ANOM}$ was made to vary, and it was verified that, for each of the RC values considered, the Q factor was optimized in correspondence with a different optimal value of $\beta_{2,ANOM}$. This demonstrates that the optimal selection of the anomalous dispersion component 19 for the purposes of reducing the effects of signal distortion must take into account the value of RC.

Figure 7:
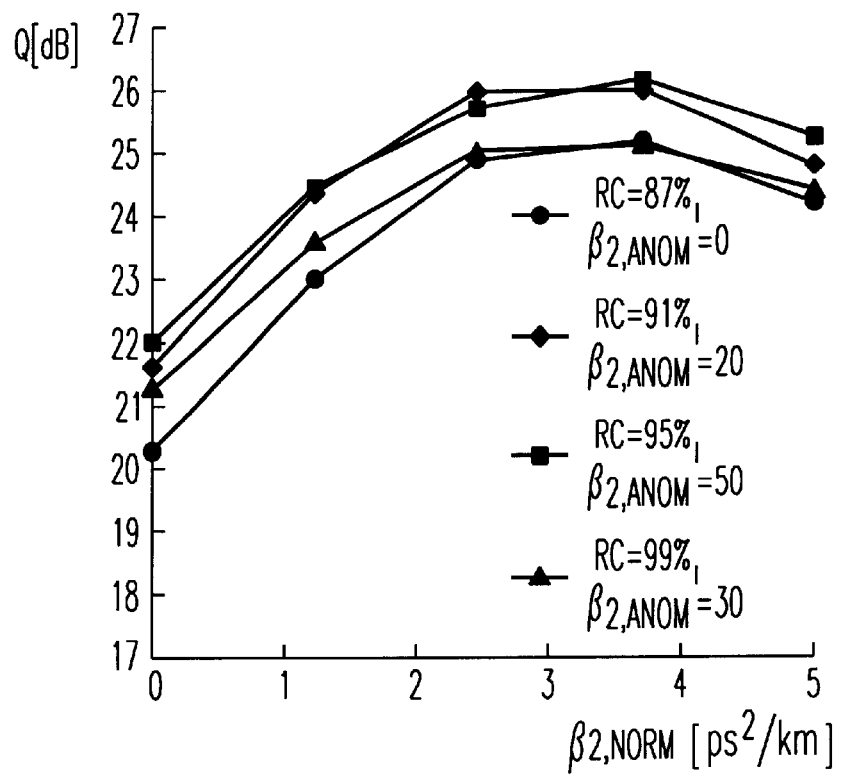

The dependence of Q on $\beta_{2,NORM}$ was then assessed in a second set of measurements in which, for each of the RC values, the value of $\beta_{2,ANOM}$ was maintained equal to the respective optimal value found previously. The dependence of Q on $\beta_{2,NORM}$ is illustrated in FIG. 7. Shown in Table 4 are the maximum values of Q detected for each of the four curves of FIG. 7, together with the values of the coefficients of dispersion $\beta_{2,ANOM}$ and $\beta_{2,NORM}$, in correspondence with which the above values of Q were detected. As can be seen, the value of $\beta_{2,NORM}$ that optimizes the Q factor is the same in all cases.

TABLE 4

| RC (%) | $\gamma$ ($W^{-1}$ $km^{-1}$) | $\beta_{2,ANOM}$ ($ps^2$ $km^{-1}$) | $\beta_{2,NORM}$ ($ps^2$ $km^{-1}$) | Q (dB) |
|---|---|---|---|---|
| 87 | 80 | 0 | 3.75 | 25.19 |
| 91 | 80 | −20 | 3.75 | 26.04 |
| 95 | 80 | −50 | 3.75 | 26.15 |
| 99 | 80 | −30 | 3.75 | 25.14 |

The results of Table 4 demonstrate a considerable improvement in the quality of the received signal with respect to the reference measure for all the RC values considered. These results demonstrate therefore that the addition upstream of the receiver 114 of a filter 115 comprising both a nonlinear, normal dispersion component and an anomalous dispersion component permits considerable improvements to be obtained in terms of signal quality.

As observed, in this case the improvement is also obtained in the case where RC=99%. According to the Applicant, this is due to the fact that, with the introduction of the anomalous dispersion component 19, there is a reduction of the distortion (readjustment) of the pulse before it enters the nonlinear, normal dispersion component 18, as a result of which the distortion introduced by the nonlinear filter 115 is minimized.

A sixth and seventh simulation were performed in order to verify if it is possible to find a single value of $\beta_{2,ANOM}$ that permits a high quality of the received signal to be achieved for all the RC values considered. In both these simulations, $\gamma$ was maintained constant and equal to 80 $W^{-1}$ $km^{-1}$.

Figure 8:
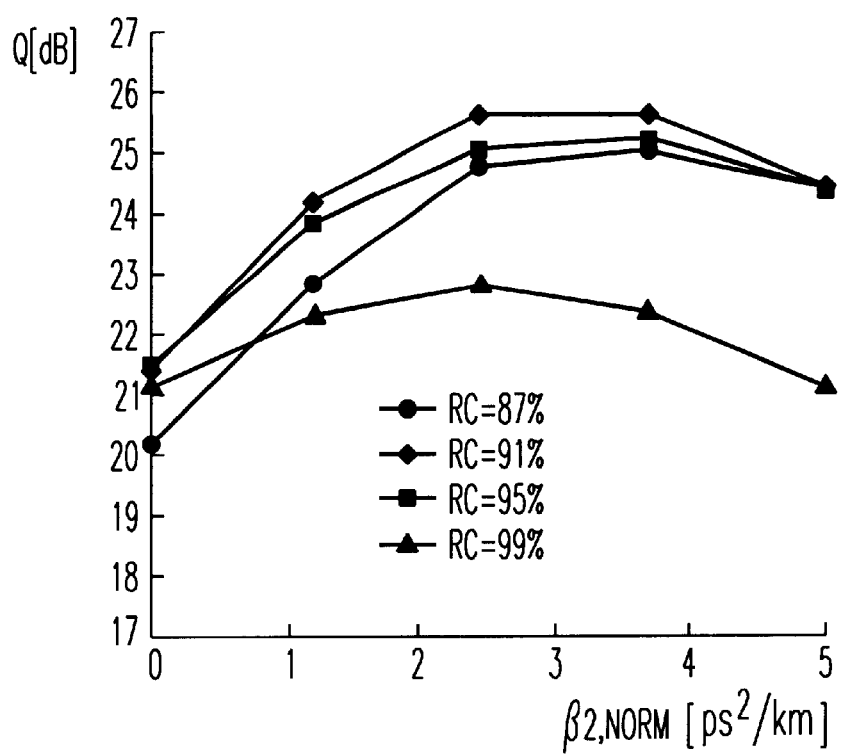

In the sixth simulation, $\beta_{2,ANOM}$ was held constant at −10 $ps^2$ $km^{-1}$. The dependence of Q on $\beta_{2,NORM}$ is depicted in FIG. 8. As seen in FIG. 8, the curves assume the relative maximum values for a value of $\beta_{2,NORM}$ between 2.5 and 4 $ps^2$ $km^{-1}$. To simplify matters for the purposes of comparison, the values of Q were all measured for a same value of $\beta_{2,NORM}$ of 3.75 $ps^2$ $km^{-1}$. These values of Q, in consideration of the shape of the relative curves, differ only slightly from the maximum values observable in FIG. 8. Shown in Table 5, on the other hand, are the values detected for Q and the values of the other parameters in correspondence with which these values of Q were detected.

TABLE 5

| RC (%) | $\gamma$ ($W^{-1}$ $km^{-1}$) | $\beta_{2,ANOM}$ ($ps^2$ $km^{-1}$) | $\beta_{2,NORM}$ ($ps^2$ $km^{-1}$) | Q (dB) |
|---|---|---|---|---|
| 87 | 80 | −10 | 3.75 | 25.17 |
| 91 | 80 | −10 | 3.75 | 25.71 |
| 95 | 80 | −10 | 3.75 | 25.21 |
| 99 | 80 | −10 | 3.75 | 22.38 |

As the results show, the value of $\beta_{2,ANOM}$ selected enables high Q values to be attained for RC of 87%, 91%, 95% but not for the RC of 99%.

Figure 9:
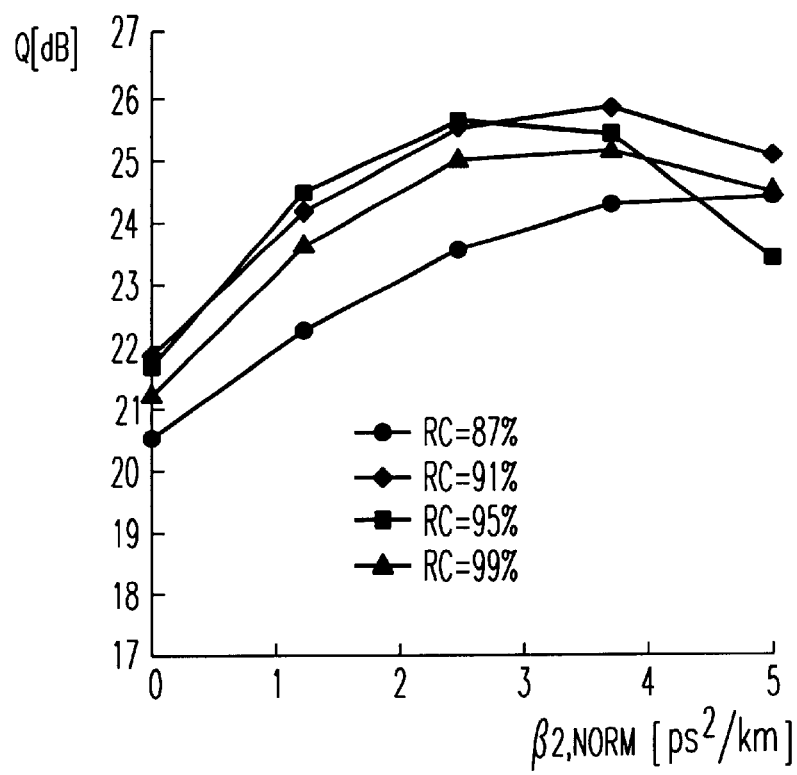

In the seventh simulation, $\beta_{2,ANOM}$ is held constant at −30 $ps^2$ $km^{-1}$. As FIG. 8 shows, the curves assume the relative maximum values for a value of $\beta_{2,NORM}$ between 2.5 and 4 $ps^2$ $km^{-1}$. The dependence of Q on $\beta_{2,NORM}$ is depicted in FIG. 9. To simplify matters for the purposes of comparison, the values of Q were all measured for the same values of $\beta_{2,NORM}$, i.e., for a $\beta_{2,NORM}$ of 2.5 $ps^2$ $km^{-1}$. These values of Q, in consideration of the shape of the relative curves, differ only slightly from the maximum values observable in FIG. 9. The values detected for Q are shown in Table 6 below, together with the values of the other parameters.

TABLE 6

| RC (%) | $\gamma$ ($W^{-1}$ $km^{-1}$) | $\beta_{2,ANOM}$ ($ps^2$ $km^{-1}$) | $\beta_{2,NORM}$ ($ps^2$ $km^{-1}$) | Q (dB) |
|---|---|---|---|---|
| 87 | 80 | −30 | 2.5 | 23.49 |
| 91 | 80 | −30 | 2.5 | 25.44 |
| 95 | 80 | −30 | 2.5 | 25.49 |
| 99 | 80 | −30 | 2.5 | 25.00 |

As the results show, the value of $\beta_{2,ANOM}$ selected enables high Q values to be attained for RC of 91%, 95% and 99% and an improvement, though smaller, for the RC of 87%.

The results of the fifth, sixth and seventh simulation demonstrate that, by suitably selecting the values of $\gamma$, $\beta_{2,NORM}$ and $\beta_{2,ANOM}$, it is possible to increase the value of Q by about 3 dB with respect to the optimized case (absence of nonlinear and dispersive effects along the line) and about 4 dB with respect to the non-optimized case (presence of nonlinear and dispersive effects along the line).

The values of $\gamma$ used in the preceding simulations are relatively high in comparison with the current processes for the manufacturing of optical fibers. With an eighth simulation and a ninth simulation, the Applicant has determined the effects of a lower value of $\gamma$, more readily attainable in actual practice. In particular, in both these simulations, Y was set equal to 20 $W^{-1}$ $km^{-1}$, representing a realistic value for a currently designed optical fiber. The average signal power was maintained at a value of 10 mW, as in the earlier cases.

In the eighth simulation, $\beta_{2,ANOM}$ was set equal to $-10$ ps$^2$ km$^{-1}$. The dependence of Q on $\beta_{2,NORM}$ for the various RC values considered is illustrated in FIG. 10.

Figure 10:
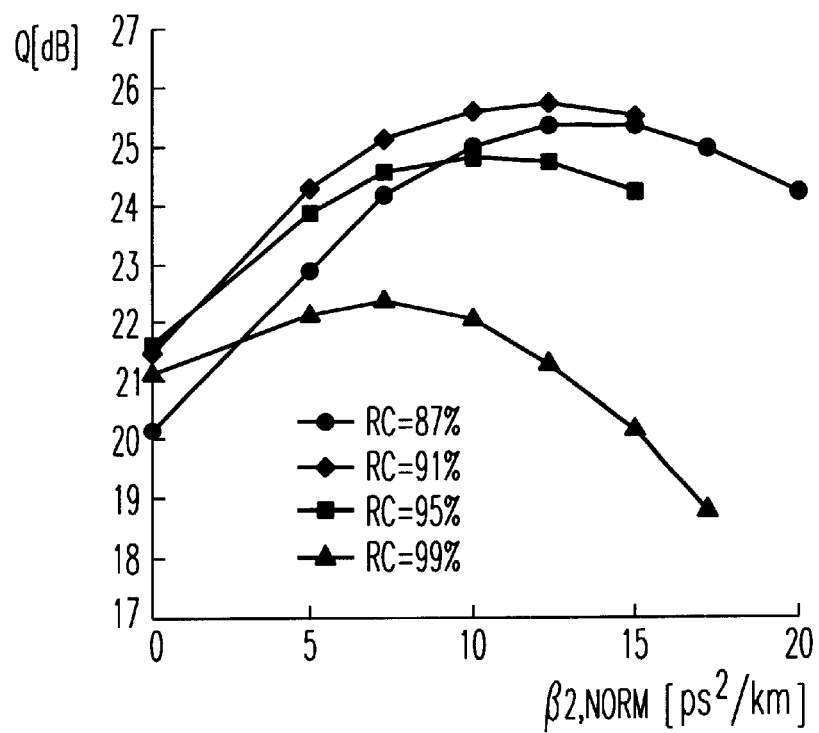

In FIG. 10, the curves assume the relative maximum values for a value of $\beta_{2,NORM}$ between 7 and 15 ps$^2$ km$^{-1}$. To simplify matters for the purposes of comparison, the values of Q were all measured for the same value of $\beta_{2,NORM}$, i.e., for a $\beta_{2,NORM}$ of 10 ps$^2$ km$^{-1}$. These values of Q, in consideration of the shape of the relative curves, differ only slightly from the maximum values observable in FIG. 10. Shown in Table 7 are the values detected for Q and the values of the other parameters in correspondence with which these values were detected.

TABLE 7

| RC (%) | $\gamma$ (W$^{-1}$ km$^{-1}$) | $\beta_{2,ANOM}$ (ps$^2$ km$^{-1}$) | $\beta_{2,NORM}$ (ps$^2$ km$^{-1}$) | Q (dB) |
|---|---|---|---|---|
| 87 | 20 | −10 | 10 | 24.93 |
| 91 | 20 | −10 | 10 | 25.60 |
| 95 | 20 | −10 | 10 | 24.84 |
| 99 | 20 | −10 | 10 | 22.07 |

Figure 11:
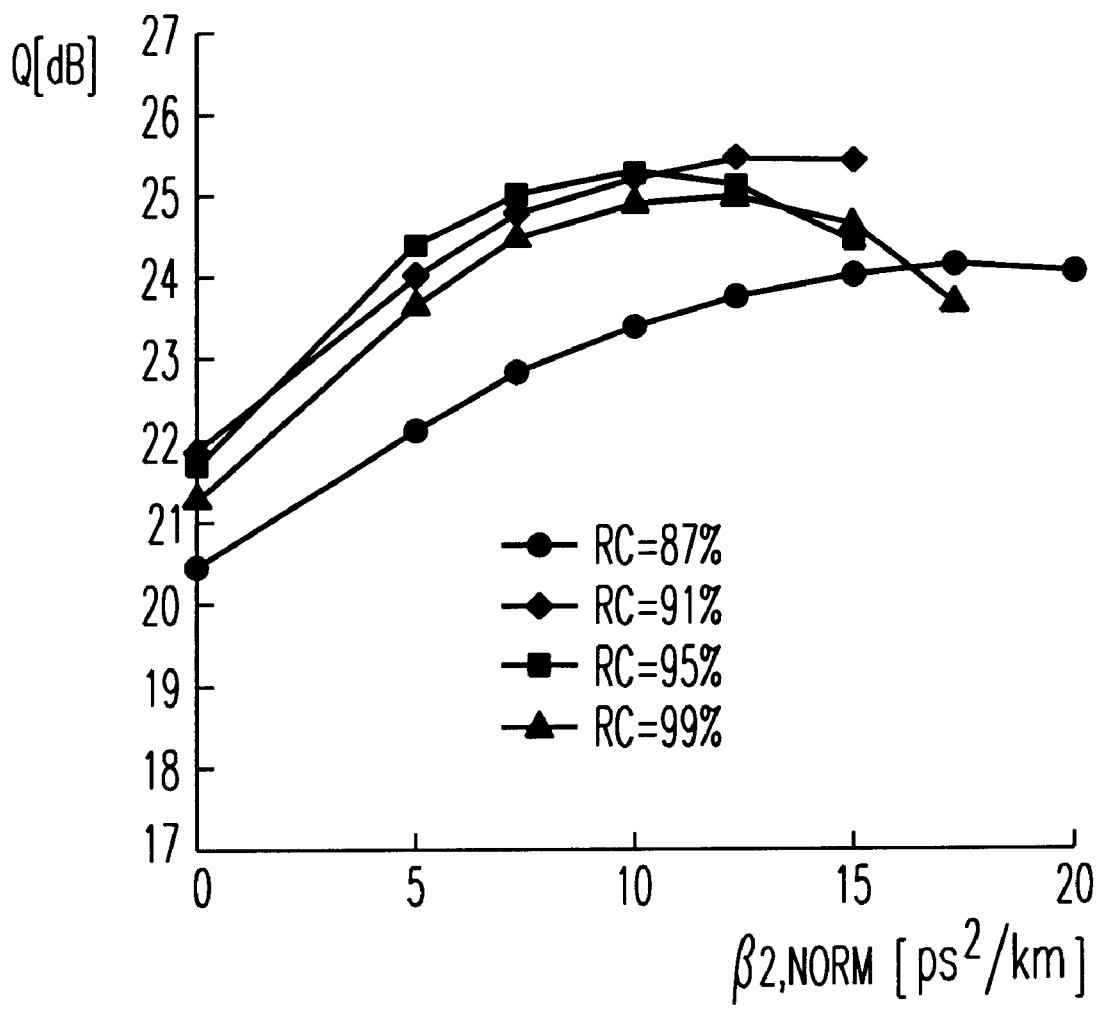

In the ninth simulation, $\beta_{2,ANOM}$ was set equal to $-30$ ps$^2$ km$^{-1}$. The dependence of Q on $\beta_{2,NORM}$ for the various RC values considered is illustrated in FIG. 11.

As seen in FIG. 10, the curves assume the relative maximum values for a value of $\beta_{2,NORM}$ between 10 and 18 ps$^2$ km$^{-1}$. To simplify matters for the purposes of comparison, the values of Q were all measured for the same value of $\beta_{2,NORM}$, i.e., for a $\beta_{2,NORM}$ of 12.5 ps$^2$ km$^{-1}$. These values of Q, in consideration of the shape of the relative curves, differ only slightly from the maximum values observable in FIG. 11. Shown in Table 8 are the values detected for Q and the values of the other parameters in correspondence with which these values were detected.

TABLE 8

| RC (%) | $\gamma$ (W$^{-1}$ km$^{-1}$) | $\beta_{2,ANOM}$ (ps$^2$ km$^{-1}$) | $\beta_{2,NORM}$ (ps$^2$ km$^{-1}$) | Q (dB) |
|---|---|---|---|---|
| 87 | 20 | −30 | 12.5 | 23.76 |
| 91 | 20 | −30 | 12.5 | 25.48 |
| 95 | 20 | −30 | 12.5 | 25.10 |
| 99 | 20 | −30 | 12.5 | 25.04 |

As the results presented in Table 7 and Table 8 demonstrate, the values obtained for Q are still on average a few dB greater than the reference value $Q_{REF}$.

Figure 12:
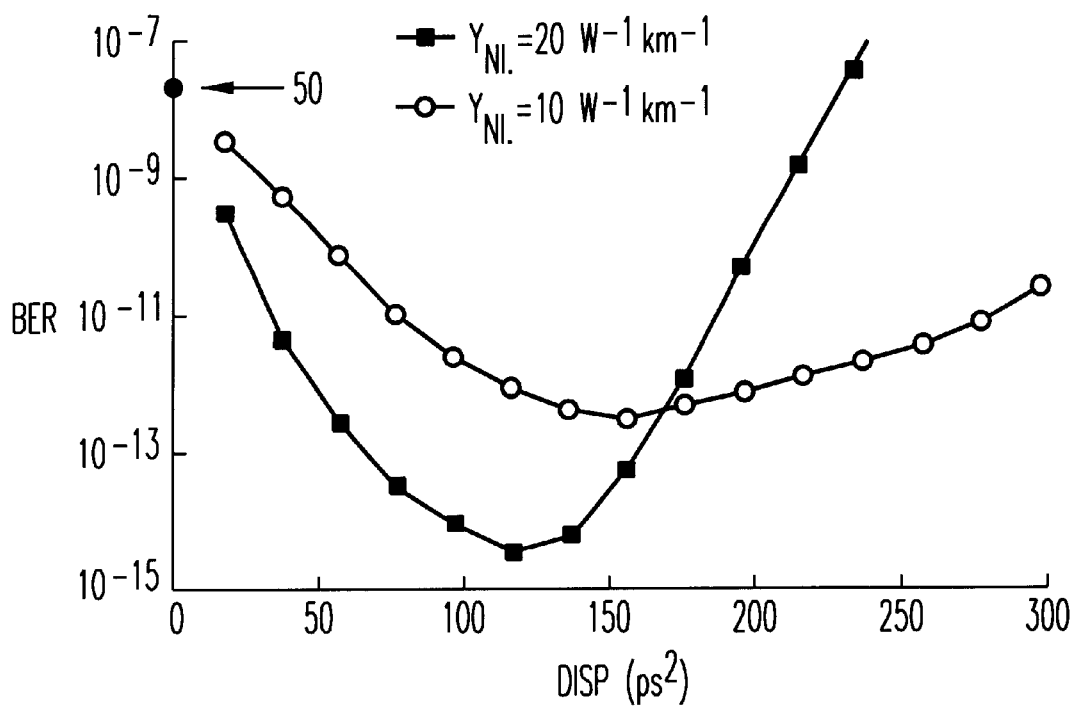
Figure 13:
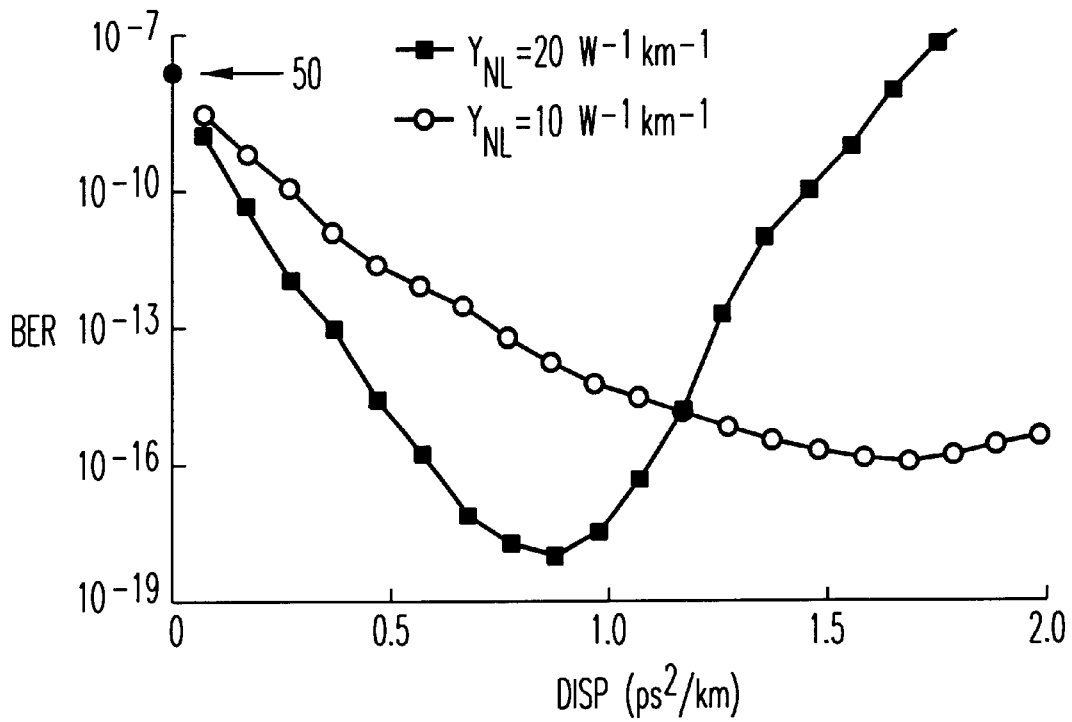

FIG. 12 shows the results of further simulations made to estimate the dependence of the BER of the signal received in the system 101 on the dispersion in the nonlinear filter 115, in the case where the nonlinear filter 115 comprises only the nonlinear, normal dispersion component 18. The measurements were made in correspondence with two different values of the nonlinearity coefficient $\gamma$, i.e., 10 W$^{-1}$ km$^{-1}$ and 20 W$^{-1}$ km$^{-1}$. Signals comprising Gaussian pulses (which approximate solitonic pulses) having temporal amplitude (FWHM) of 30 ps and being transmitted with a bit rate of 10 Gbit/s were considered. A bandwidth of 8 GHz was selected for the electronic filter disposed downstream of the receiver 114. In FIG. 12, on the axis of the ordinates, 50 indicates an estimate for the BER value in the case of the absence of the nonlinear filter 115 (disp=0). The curves of FIG. 12 show that, although the effect of the filter is better with $\gamma$=20 W$^{-1}$ km$^{-1}$ only below a dispersion threshold (in the region of 170 ps$^2$), this value of $\gamma$ permits lower BER values to be attained, with selected values $\beta_{2,NORM}$ and length L of the fiber of the filter, than those in the case in which $\gamma$=10 W$^{-1}$ km$^{-1}$.

The measurements were repeated with a bit rate of 40 Gbit/s and with pulses of duration (FWHM) of 7.5 ps. A bandwidth of 32 GHz was selected for the electronic filter. The results of these further measurements, shown in FIG. 13, substantially confirm the results of FIG. 12.

It is clear that changes and variations may be made to the method and system described and illustrated herein, without departing from the protective scope of the invention.

For example, the anomalous dispersion component 19 of the nonlinear filter 15 may be, instead of an optical fiber, a chirped Bragg grating with anomalous dispersion or another known component suitable for generating the same anomalous dispersion effect such as, for example, a pair of free-space diffraction gratings. Similarly, the normal dispersion component 18'b of the nonlinear filter 15', instead of a normal dispersion optical fiber, may be a chirped Bragg grating with normal dispersion or another known component suitable for generating the same normal dispersion effect such as, for example, a pair of free-space diffraction gratings. Finally, the nonlinear component 18'b of the nonlinear filter 15', instead of a nonlinear optical fiber, could be a semiconductor component or another known component suitable for generating the same nonlinearity effect.

Furthermore, it is possible to produce a system in which only some of the receivers are preceded by a respective nonlinear filter 15 and/or in which one or more of the filters has different characteristics from the others. In the latter case, each filter may be associated with respective values for $\beta_{2,NORM}$, $\gamma$ and, where applicable, $\beta_{2,ANOM}$, selected in such a way as to obtain an improvement of the Q value associated with the respective signal.

The noise reduction technique described in this invention, as well as being particularly effective in reducing the effects on the receiver of the ASE noise generated by the optical amplifiers amplifying the optical signal, is effective in reducing the effects on the receiver of any noise contribution of the system 1 that may be described in statistical terms and as a complex quantity comprising a component in phase with the signal itself.

Also the noise reduction technique described and illustrated herein may be implemented in any optical telecommunications system, monodirectional or bidirectional, of the type comprising a transmitter (5), an optical link (6–9, 12, 13) suitable for generating optical noise of the above type, and a receiver (14).

What is claimed is:

1. A method for reducing noise in a long distance optical telecommunications system, comprising:
   transmitting an optical signal on an optical fiber telecommunications line that comprises optical amplifiers and has a substantially compensated dispersion;
   receiving from said line a noisy optical signal that comprises said transmitted optical signal and an optical noise signal;
   generating an electronic signal correlated with said noisy optical signal, said electronic signal being associated with a quality parameter (Q) that depends on said optical noise signal and distortion of said optical signal; and
   applying to said optical signal a nonlinear phase-shift $e^{i\psi}$ associated with a variation of phase $\psi$ greater than 0.5 radiants, and a normal dispersion $\beta_{2,NORM}\cdot L$, said nonlinear phase-shift and said normal dispersion being operatively selected to increase said quality parameter by at least 1 dB.

2. The method according to claim 1, wherein said normal dispersion is less than 500 ps².

3. The method according to claim 1, wherein said normal dispersion is less than 200 ps².

4. The method according to claim 1, wherein said normal dispersion is less than 100 ps².

5. The method according to claim 1, wherein said compensated dispersion of said telecommunications line is compensated according to a compensation ratio of between 80% and 120%.

6. The method according to claim 1, wherein said compensated dispersion of said telecommunications line is compensated according to a compensation ratio of between 85% and 115%.

7. The method according to claim 1, wherein said compensated dispersion of said telecommunications line is compensated according to a compensation ratio of between 90% and 110%.

8. The method according to claim 1, wherein said optical signal in said step of transmitting carries coded information.

9. The method according to claim 1, wherein said optical signal in said step of transmitting is an RZ type digital optical signal carrying coded information.

10. The method according to claim 1, wherein said step of applying comprises applying said nonlinear phase-shift then said normal dispersion.

11. The method according to claim 1, further comprising applying an anomalous dispersion to said optical signal and said noise.

12. The method according to claim 11, wherein said anomalous dispersion in the step of applying the anomalous dispersion has a value between −1000 ps² and 0 ps².

13. The method according to claim 11, wherein said anomalous dispersion in the step of applying the anomalous dispersion has a value between −500 ps² and 0 ps².

14. The method according to claim 1, further comprising amplifying said optical signal to a pre-established power level.

15. The method according to claim 1, further comprising wavelength filtering said optical signal.

16. The method according to claim 1, further comprising:
transmitting a plurality of optical signals at a different wavelength; and receiving said plurality of optical signals.

17. The method according to claim 16, further comprising:

separating the optical signals along distinct optical paths; and applying along one of said optical paths said nonlinear phase-shift and said normal dispersion.

18. The method according to claim 17, wherein the step of applying is along each of said optical paths.

19. An optical telecommunications system, comprising:
a transmitter configured to generate an optical signal;
an optical link that comprises an optical amplifier configured to transmit said optical signal in a pre-established direction of propagation with substantially compensated dispersion to have an associated optical noise; and a receiver configured to receive a noisy optical signal including said transmitted optical signal and an optical noise signal, said receiver comprising, a photodetecting device configured to generate an electronic signal correlated with said noisy optical signal, said electronic signal being associated with a quality parameter (Q) that depends on said optical noise signal and distortion of said optical signal in said optical link, wherein said optical link further comprises a dispersive and nonlinear filtering device that comprises a normal dispersion and nonlinear component, the filtering device being placed along said optical link and having an associated normal dispersion parameter $\beta_{2,NORM} \cdot L$ and a nonlinearity parameter $\gamma$ operatively selected so as to increase said quality parameter by at least 1 dB.

20. The system according to claim 19, wherein said optical signal is an RZ type digital signal.

21. The system according to claim 19, wherein said normal dispersion and nonlinear component comprises:
a first nonlinear element; and
a second normal dispersion element, wherein said first element is disposed upstream of said second element along said direction of propagation.

22. The system according to claim 19, wherein said filtering device comprises:
an anomalous dispersion component connected in a cascade fashion with said normal dispersion and nonlinear component and disposed upstream of said normal dispersion and nonlinear component along said direction of propagation.

23. The system according to claim 19, wherein said filtering device comprises:
a first optical amplifier configured to amplify said optical signal to a pre-established power level, said first optical amplifier being disposed upstream of said normal dispersion and nonlinear component along said direction of propagation.

24. The system according to claim 19, wherein said filtering device comprises a band-pass optical filter.

25. The system according to claim 19, wherein said optical link comprises another optical amplifier disposed upstream of said filtering device along said direction of propagation and suitable for amplifying said optical signal.

26. The system according to claim 19, further comprising:
a plurality of transmitters configured to transmit a plurality of optical signals at different wavelengths; and
a plurality of receivers configured to receive said optical signals.

27. The system according to claim 26, further comprising:
an optical signal multiplexing device disposed upstream of said optical transmission line along said direction of propagation; and
an optical signal demultiplexing device disposed downstream of said optical transmission line along said direction of propagation,
wherein said filtering device is disposed downstream of said demultiplexing device along said direction of propagation.

28. The system according to claim 19, wherein said optical link comprises a chromatic dispersion compensator (10).

29. The system according to claim 21, wherein said normal dispersion and nonlinear component is formed by an optical fiber.

30. The system according to claim 21, wherein said first nonlinear element is an optical fiber.

31. The system according to claim 21, wherein said first nonlinear element is a semiconductor device.

32. The system according to claim 21, wherein said second normal dispersion element is an optical fiber.

33. The system according to claim 21, wherein said second normal dispersion element comprises a Bragg grating.

34. The system according to claim 22, wherein said anomalous dispersion component is an optical fiber.

35. The system according to claim 22, wherein said anomalous dispersion component comprises a Bragg grating.

36. A device for reducing noise in a compensated dispersion optical telecommunications system, said device comprising:
a receiver configured to receive a noisy optical signal from a compensated dispersion optical link, said noisy optical signal including an optical signal and an optical noise signal, said receiver comprising,
a photodetector configured to generate an electronic signal correlated with said noisy optical signal, said electronic signal being associated with a quality parameter (Q) that depends on a level of distortion associated with said noisy optical signal in said optical link;
an optical input configured to optically connect to said optical link; and
an optical output configured to being optically connected to said receiver, said optical output comprising a nonlinear component with normal dispersion characteristics, said nonlinear component having a normal dispersion parameter $\beta_{2,NORM} \cdot L$ and a nonlinearity parameter $\gamma$ operatively selected so as to increase said quality parameter by at least 1 dB.

37. The device according to claim 36, wherein said optical signal is an RZ type digital signal.

38. The device according to claim 36, wherein said normal dispersion and nonlinear component comprises:
a first nonlinear element; and 39. The device according to claim 38, wherein said normal dispersion and nonlinear component is formed by an optical fiber.

40. The device according to claim 38, wherein said first nonlinear element is an optical fiber.

41. The device according to claim 38, wherein said first nonlinear element is a semiconductor device.

42. The device according to claim 38, wherein said second normal dispersion element is an optical fiber.

43. The device according to claim 38, wherein said second normal dispersion element comprises a Bragg grating.

44. The device according to claim 39, wherein said anomalous dispersion component is an optical fiber.

45. The device according to claim 39, wherein said anomalous dispersion component comprises a Bragg grating.

46. A method for reducing noise in a long distance optical telecommunications system in which an optical signal is communicated on an optical fiber telecommunications, comprising:
receiving from the telecommunications line a noisy optical signal that comprises the transmitted optical signal and an optical noise signal;
generating an electronic signal correlated with said noisy optical signal, said electronic signal being associated with a quality parameter that depends on said optical noise signal and distortion of said optical signal; and
applying to said optical signal a nonlinear phase-shift $e^{i\phi}$ associated with a variation of phase $\phi$ greater than 0.5 radiants, and a normal dispersion $\beta_{2,NORM} \cdot L$, said nonlinear phase-shift and said normal dispersion being operatively selected to increase said quality parameter by at least 1dB.

47. The method according to claim 46, wherein said normal dispersion is less than 500 ps$^2$.

48. The method according to claim 46, wherein said normal dispersion is less than 200 ps$^2$.

49. The method according to claim 46, wherein said normal dispersion is less than 100 ps$^2$.

50. The method according to claim 46, wherein said compensated dispersion of said telecommunications line is compensated according to a compensation ratio of between 80% and 120%.

51. The method according to claim 46, wherein said compensated dispersion of said telecommunications line is compensated according to a compensation ratio of between 85% and 115%.

52. The method according to claim 46, wherein said compensated dispersion of said telecommunications line is compensated according to a compensation ratio of between 90% and 110%.

53. The method according to claim 46, wherein said optical signal in said step of transmitting carries coded information.

54. The method according to claim 46, wherein said optical signal in said step of transmitting is an RZ type digital optical signal carrying coded information.

55. The method according to claim 46, wherein said step of applying comprises applying said nonlinear phase-shift then said normal dispersion.

56. The method according to claim 46, further comprising applying an anomalous dispersion to said optical signal and said noise.

57. The method according to claim 56, wherein said anomalous dispersion in the step of applying the anomalous dispersion has a value between −1000 ps$^2$ and 0 ps$^2$.

58. The method according to claim 56, wherein said anomalous dispersion in the step of applying the anomalous dispersion has a value between −500 ps$^2$.

59. The method according to claim 46, further comprising amplifying said optical signal to a pre-established power level.

60. The method according to claim 46, further comprising wavelength filtering said optical signal.

61. The method according to claim 46, wherein a plurality of optical signals are transmitted at a different wavelength, and further comprising:
receiving said plurality of optical signals.

62. The method according to claim 61, further comprising:
separating the optical signals along distinct optical paths; and
applying along one of said optical paths said nonlinear phase-shift and said normal dispersion.

63. The method according to claim 62, wherein the step of applying is along each of said optical paths.

64. An optical telecommunications device to be connected to an optical link on which a transmitted optical signal is communicated, comprising:
a receiver configured to receive a noisy optical signal including the transmitted optical signal and an optical noise signal, said receiver comprising,
a photodetecting device configured to generate an electronic signal correlated with said noisy optical signal, said electronic signal being associated with a quality parameter that depends on said optical noise signal and distortion of said optical signal in said optical link.

65. The system according to claim 64, wherein said optical signal is an RZ type digital signal.

66. A device for reducing noisy a compensated dispersion optical telecommunications system, said device comprising:

receiver means for receiving a noisy optical signal from a compensated dispersion optical link, said noisy optical signal including an optical signal and an optical noise signal, said receiver means comprising, photodetector means for generating an electronic signal correlated with said noisy optical signal, said electronic signal being associated with a quality parameter that depends on a level of distortion associated with said noisy optical signal in said optical link;

input means for optically connecting to said optical link; and output means for optically connecting to said receiver means, said output means comprising a nonlinear normal dispersion means having a normal dispersion parameter $\beta_{2,NORM} \cdot L$ and a nonlinearity parameter $\gamma$ operatively for increasing said quality parameter by at least 1 dB.

67. The device according to claim 66, wherein said optical signal is an RZ type digital signal.

68. The device according to claim 66, wherein said nonlinear normal dispersion means comprises:

first nonlinear means; and second normal dispersion means, wherein said first nonlinear means is disposed upstream of said second normal dispersion means along said direction of propagation.

69. The device according to claim 68, wherein said nonlinear normal dispersion means is formed by an optical fiber means.

70. The device according to claim 68, wherein said first nonlinear means is an optical fiber.

71. The device according to claim 68, wherein said first nonlinear means is a semiconductor device.

72. The device according to claim 68, wherein said second normal dispersion means is an optical fiber.

73. The device according to claim 68, wherein said second normal dispersion means comprises a Bragg grating.

74. The device according to claim 69, wherein said anomalous dispersion means is an optical fiber.

75. The device according to claim 69, wherein said anomalous dispersion means comprises a Bragg grating.

76. A device for reducing noise in a compensated dispersion optical telecommunications system, said device comprising:

receiver means for receiving a noisy optical signal from a compensated dispersion optical link, said noisy optical signal including an optical signal and an optical noise signal, said receiver means comprising, photodetector means for generating an electronic signal correlated with said noisy optical signal, said electronic signal being associated with a quality parameter that depends on a level of distortion associated with said noisy optical signal in said optical link; and 77. The device according to claim 76, wherein said optical signal is an RZ type digital signal.

\* \* \* \* \*

UNITED STATES PATENT AND TRADEMARK OFFICE
CERTIFICATE OF CORRECTION

PATENT NO. : 6,538,788 B2
DATED : March 25, 2003
INVENTOR(S) : Pierluigi Franco et al.

It is certified that error appears in the above-identified patent and that said Letters Patent is hereby corrected as shown below:

<u>Column 27,</u>
Line 51, after "telecommunications" insert -- line --.
Line 60, "phase-shift" delete "$e^{i\phi}$" and insert -- $e^{i\varphi}$ --.
Line 61, after "phase" delete "$\phi$" and insert -- $\varphi$ --.

<u>Column 28,</u>
Line 34, after "500 ps$^2$", insert -- 0 ps$^2$ --.
Line 66, after "reducing", delete "noisy" and insert -- noise in --.

Signed and Sealed this

Twenty-seventh Day of January, 2004

JON W. DUDAS
*Acting Director of the United States Patent and Trademark Office*